United States Patent
Park et al.

(10) Patent No.: US 10,819,954 B2
(45) Date of Patent: *Oct. 27, 2020

(54) DISTRIBUTED VIDEO SENSOR PANORAMIC IMAGING SYSTEM

(71) Applicant: Immersive Licensing, Inc., Vernon (CA)

(72) Inventors: Michael C. Park, Portland, OR (US); Patrick W. White, Portland, OR (US); Steven C. Sandven, Portland, OR (US)

(73) Assignee: Immersive Licensing, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,291

(22) Filed: Jul. 1, 2019

(65) Prior Publication Data

US 2019/0327447 A1 Oct. 24, 2019

Related U.S. Application Data

(63) Continuation of application No. 13/309,414, filed on Dec. 1, 2011, now Pat. No. 10,375,355, which is a continuation of application No. 11/611,833, filed on Dec. 15, 2006, now Pat. No. 8,094,182.

(60) Provisional application No. 60/866,179, filed on Nov. 16, 2006.

(51) Int. Cl.
*H04N 7/18* (2006.01)
*G06T 7/80* (2017.01)
*G06T 7/30* (2017.01)

(52) U.S. Cl.
CPC ............... *H04N 7/18* (2013.01); *G06T 7/30* (2017.01); *G06T 7/80* (2017.01); *H04N 7/181* (2013.01); *G06T 2200/24* (2013.01); *G06T 2207/20092* (2013.01)

(58) Field of Classification Search
CPC . H04N 7/18; H04N 7/181; G06T 7/80; G06T 7/30; G06T 2200/24
USPC ........................................... 348/36
See application file for complete search history.

(56) References Cited

U.S. PATENT DOCUMENTS

| | | |
|---|---|---|
| 6,195,204 B1 | 2/2001 | Nalwa |
| 6,810,152 B2 * | 10/2004 | Endo ............. G06T 1/00 348/36 |
| 7,126,630 B1 | 10/2006 | Lee et al. |
| 2001/0056574 A1 | 12/2001 | Richards |
| 2002/0046218 A1 | 4/2002 | Gilbert et al. |
| 2002/0063709 A1 | 5/2002 | Gilbert et al. |

(Continued)

*Primary Examiner* — Minh Chau Nguyen
(74) *Attorney, Agent, or Firm* — Chernoff, Vilhauer, McClung & Stenzel, LLP

(57) ABSTRACT

A panoramic imaging system includes a plurality of separated video cameras that may be distributed around an object. A series of images captured by at least one of the separated video cameras is stored in a predetermined file format. The panoramic system further includes a viewer module that may render the series of images using the first file format. Moreover, the panoramic system includes a calibration module capable of modifying information associated with at least one of the series of images, where the modification results in calibration data stored in a configuration file and/or in the predetermined file format. The viewer module may also be capable of rendering the series of images in accordance with the predetermined file format.

21 Claims, 22 Drawing Sheets

(56) References Cited

U.S. PATENT DOCUMENTS

| | | |
|---|---|---|
| 2003/0030636 A1* | 2/2003 | Yamaoka .............. G06T 1/0007 |
| | | 345/419 |
| 2003/0046177 A1 | 3/2003 | Winchester et al. |
| 2004/0027451 A1 | 2/2004 | Baker |
| 2004/0105597 A1* | 6/2004 | Lelescu ................ G06T 3/0018 |
| | | 382/276 |
| 2004/0233274 A1 | 11/2004 | Uyttendaele et al. |
| 2005/0146623 A1 | 7/2005 | Juen |
| 2005/0179942 A1 | 8/2005 | Stavely et al. |
| 2005/0207487 A1 | 9/2005 | Monroe |
| 2006/0034367 A1 | 2/2006 | Park |
| 2006/0115181 A1 | 6/2006 | Deng et al. |
| 2006/0197761 A1 | 9/2006 | Suzuki et al. |
| 2006/0235765 A1 | 10/2006 | David |
| 2007/0024612 A1* | 2/2007 | Balfour .................. G06T 17/05 |
| | | 345/419 |
| 2007/0279494 A1 | 12/2007 | Aman et al. |
| 2007/0285554 A1 | 12/2007 | Givon |
| 2008/0007617 A1 | 1/2008 | Ritchey |
| 2008/0024594 A1* | 1/2008 | Ritchey ................ H04N 5/2254 |
| | | 348/36 |
| 2009/0148149 A1 | 6/2009 | Chishima |
| 2009/0179773 A1* | 7/2009 | Denny ...................... G06T 7/80 |
| | | 340/901 |

* cited by examiner

DISTRIBUTED VIDEO SENSOR PANORAMIC IMAGING SYSTEM

REFERENCE TO RELATED APPLICATIONS

This application is a continuation under 35 U.S.C. § 120 of co-pending U.S. patent application Ser. No. 13/309,414, entitled "Distributed Video Sensor Panoramic Imaging System," filed on Dec. 1, 2011, which is itself a continuation of U.S. patent application Ser. No. 11/611,833, entitled "Distributed Video Sensor Panoramic Imaging System," filed on Dec. 15, 2006 (now U.S. Pat. No. 8,094,182), which claims priority under 35 U.S.C. § 119(e) of U.S. Provisional Patent Application No. 60/866,179, filed on Nov. 16, 2006 and entitled "Distributed Video Sensor Panoramic Imaging System".

BACKGROUND

In general, "panoramic imaging" refers to the ability for showing a visual scene with a relatively high degree, or "wide," field of view. For example, panoramic imaging may involve capturing images showing a 360° field of view around a particular object.

While a field of view of a single camera may be increased to some extent to capture a panoramic scene, generally multiple cameras are needed to capture true high-resolution panoramic video. A typical way to perform panoramic imaging involves the use of a "fixed head" immersive video sensor. As shown in FIG. 1, this type of video sensor 10 is formed of multiple video cameras 12, 14, 16, 18, 20, 22. The video cameras 12, 14, 16, 18, 20, 22 are positioned close to each other around a fixed head 24 (the fixed head 24 preferably being as small as possible to allow the video cameras 12, 14, 16, 18, 20, 22 to be positioned closer to each other) such that they collectively have a 360° field of view around the fixed head 24. Typically, the video cameras 12, 14, 16, 18, 20, 22 are positioned close to each other and set to each have a 60-62° field of view (thus, allowing for slight overlap among the edges of images captured by the video cameras 12, 14, 16, 18, 20, 22). Thus, in general, a fixed head immersive video sensor, such as one of the type shown in FIG. 1, can be used to capture horizontally an/or vertically panoramic images from a single, fixed point in space.

Deploying a fixed head immersive video sensor involves positioning the sensor on the exterior of an object from which a panoramic image is desired. For example, should one wish to capture a panoramic image around a vehicle (for, for example, safety or surveillance purposes), the fixed head immersive video sensor could be attached to the vehicle roof, at some height therefrom, in order to minimize or remove any visual obstructions that might otherwise be caused by the vehicle itself. However, such exterior deployment of the fixed head immersive video sensor may subject the sensor to, for example, adverse weather conditions (e.g., humidity, rain, wind), travel conditions (e.g., wind at high speeds, height clearance, drag), and structural issues (e.g., if the vehicle is very wide and/or long, the sensor will have to be disposed at a greater height to avoid visual obstructions caused by the vehicle, thereby requiring increased attention and potential expense to the mechanism or structure supporting the sensor above the vehicle). Moreover, for example, in a military application in which a fixed head immersive video sensor is used for enemy surveillance, the exteriorly positioned sensor represents a fairly unprotected point of attack by which the enemy can bring down the entire surveillance system with a single shot.

Alternatively, a fixed head immersive video sensor could be positioned inside the object, but this often introduces obstructions into the field of view. For example, if a fixed head immersive video sensor is positioned in the interior of a vehicle, the roof, doors, dashboard, seats, occupants, and other opaque objects within the vehicle would obstruct one or more portions of the cumulative field of view of the fixed head immersive video sensor.

SUMMARY

According to at least one aspect of one or more embodiments of the present invention, a panoramic imaging system comprises: a plurality of separated video cameras capable of being distributed around an object, where a series of images captured by at least one of the separated video cameras is stored in a predetermined file format; a viewer module capable of rendering the series of images using the predetermined file format; and a calibration module capable of modifying information associated with at least one of the series of images, where the modification results in at least one of creation of calibration data and modification of the predetermined file format, and where the viewer module is capable of rendering the series of images in accordance with the calibration data, the calibration data being storable in the predetermined file format.

According to another aspect of one or more embodiments of the present invention, a panoramic imaging method comprises: capturing images with separated video cameras distributed around an object; storing at least one of the captured images in a predetermined file format, where the at least one captured image is renderable according to a first set of information; and aligning the at least one captured image, wherein the aligning results in generation of a second set of information capable of being stored in a configuration file, where the at least one captured image is renderable in accordance with the second set of information.

According to another aspect of one or more embodiments of the present invention, a computer-readable medium having instructions stored therein to: input at least one image captured by at least one of a plurality of separated video cameras distributed around an object, where the inputted at least one captured image is in a predetermined file format; display the at least one captured image; adjust a characteristic of the at least one captured image in response to a command provided by a user to which the at least one captured image is displayed; and storing calibration data associated with the adjustment in the predetermined file format.

According to another aspect of one or more embodiments of the present invention, a computer-readable medium has instructions stored therein that are executable by a processor to: receive a series of images captured by at least one of a plurality of separated video cameras distributed around an object; and visually render the series of images in a panoramic format according to display information specified in a file format of the series of images.

According to another aspect of one or more embodiments of the present invention, a method of capturing images includes: capturing at least one image of a first field of view using a first separated camera disposed at a first location at least one of in an interior region of an object and an exterior region of the object; and capturing at least one image of a second field of view using a second separated camera disposed at a second location at least one of in the interior region of the object and the exterior region of the object, where, prior to capturing the images, the first separated video camera and the second separated video camera are adjusted such that an edge of the first field of view is aligned with an edge of the second field of view.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description. Further, it is noted that the various depictions of one or more embodiments in the figures referred to and described below are not necessarily to scale.

In general, embodiments of the present invention relate to a panoramic imaging system that uses separated video cameras distributed around an object. More particularly, in one or more embodiments, separated video cameras may be placed around an interior of an object (e.g., vehicle, a building structure) and adjusted such that each video camera has an unobstructed view of a region exterior to the object. Images captured by the separated video cameras may be rendered in real-time and/or may also be modified after capture to yield a desired panoramic scene.

Figure 1:
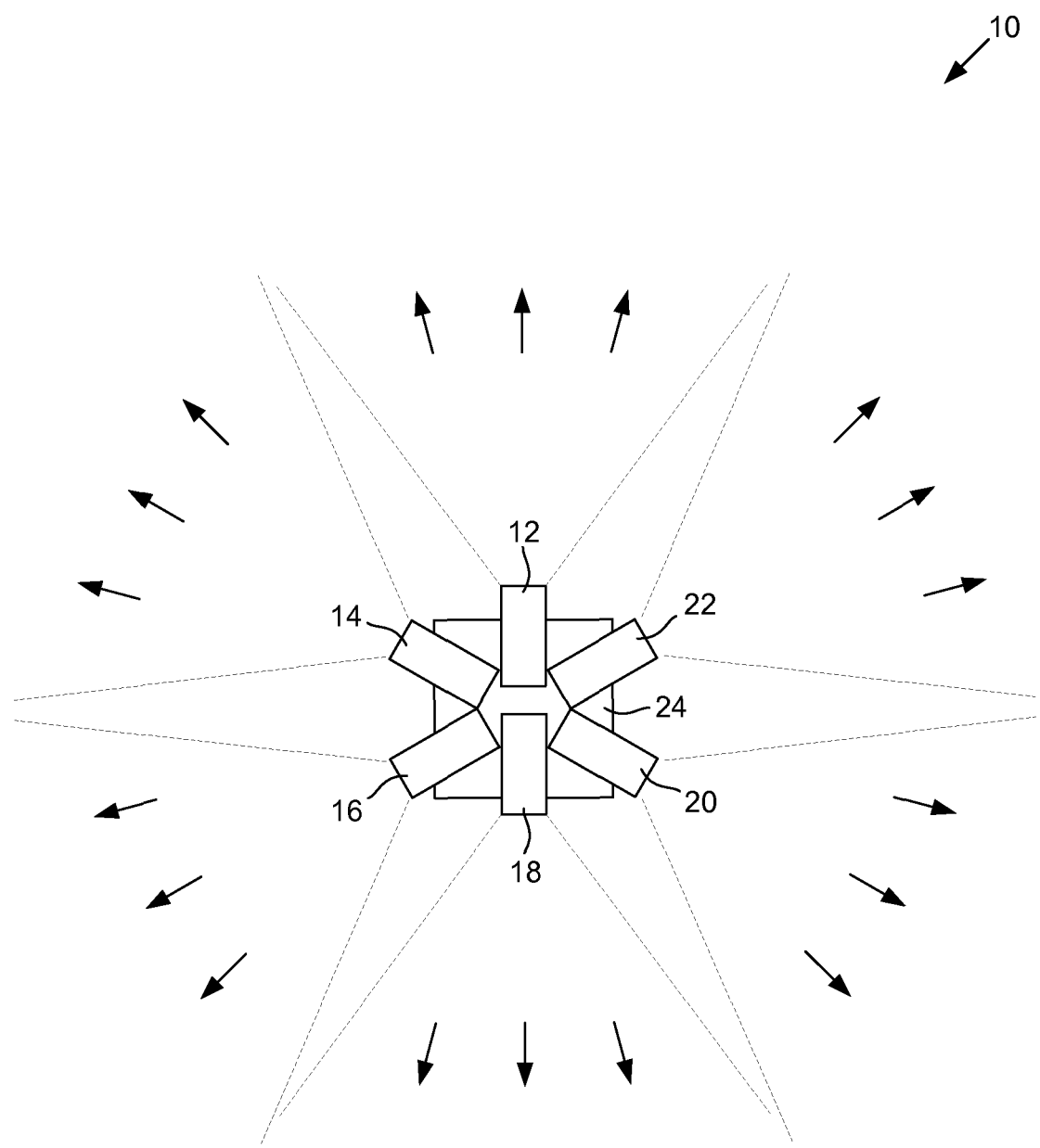
FIG. 1 shows a prior art panoramic imaging system.
Figure 2:
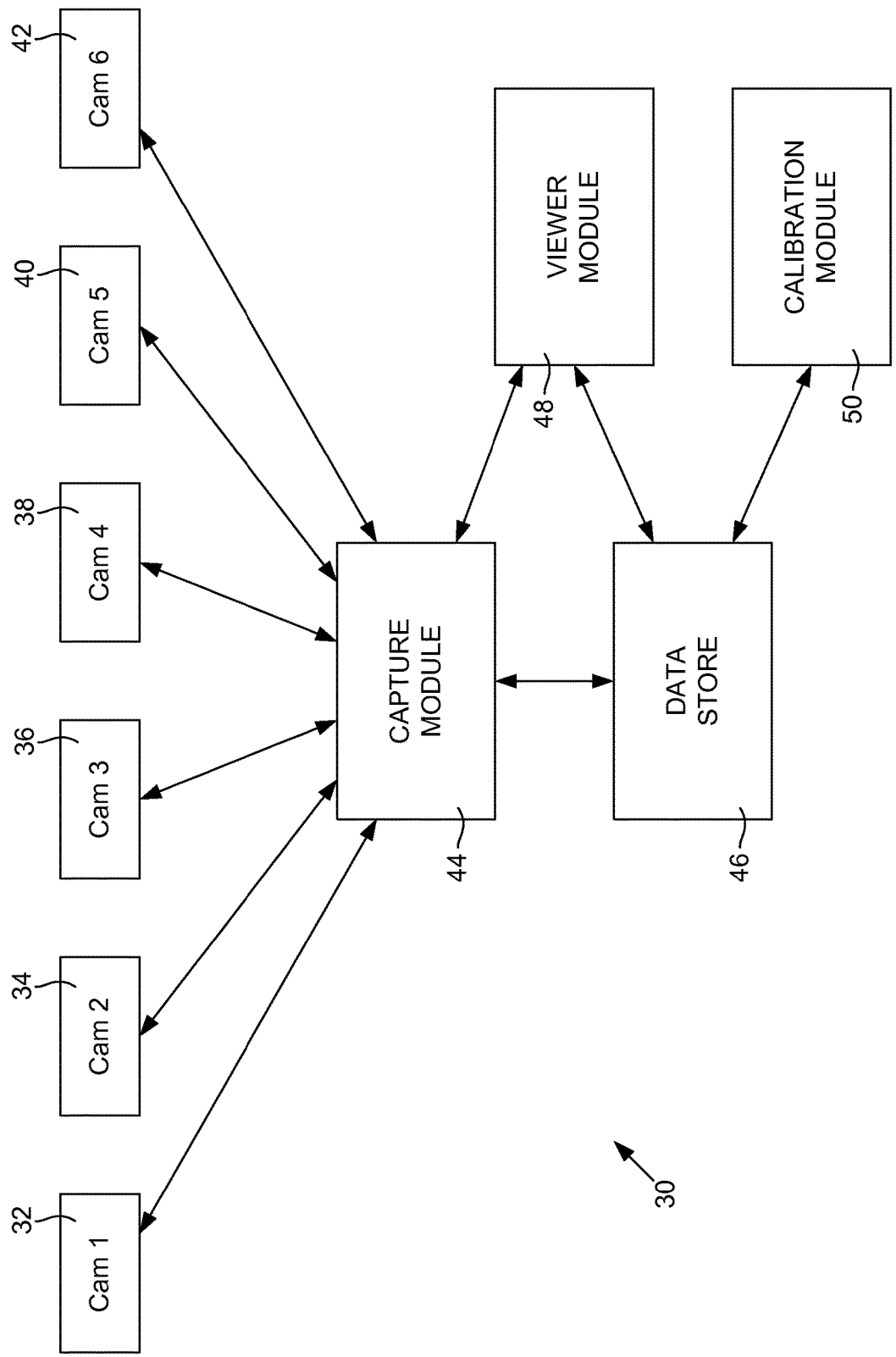
FIG. 2 shows a panoramic imaging system in accordance with an embodiment of the present invention.

FIG. 2 shows a panoramic imaging system 30 in accordance with an embodiment of the present invention. Video cameras 32, 34, 36, 38, 40, 42 represent separately disposed cameras (i.e., "separately disposed" in that the video cameras 32, 34, 36, 38, 40, 42 are not all positioned on a single fixed head such as that shown in FIG. 1) distributed around some object (not shown). In general, each of the separated video cameras 32, 34, 36, 38, 40, 42 may be any device that is capable of capturing an image (or video, being a series of images) of the respective field of view of that video camera. There is no limitation on the type of video camera that may be used or whether the video cameras have to be of a similar type.

In one or more embodiments, one or more of the separated video cameras 32, 34, 36, 38, 40, 42 may be an NTSC camera, a PAL camera, an IP camera, and/or another type of high-end digital camera. Also, in one or more embodiments, any type of color, black and white, and/or infrared camera may be used. Further, in one or more embodiments, one or more of the separated video cameras 32, 34, 36, 38, 40, 42 may be a consumer-version digital (or analog) video camcorder. Moreover, in one or more embodiments, one or more of the separated video cameras 32, 34, 36, 38, 40, 42 may be an internet camera commonly available for use with personal computers (e.g., desktop computers, laptop computers). Further still, in one or more embodiments, one or more of the separated video cameras 32, 34, 36, 38, 40, 42 may have a zooming feature. Thus, in general, a camera usable in accordance with one or more embodiments may any imaging device capable of observing any part of the visible or non-visible spectrum. Various different types of cameras may be used in a particular embodiment.

Additionally, in one or more embodiments, one or more of the separated video cameras 32, 34, 36, 38, 40, 42 may be enabled to wirelessly communicate with one or more of the other components of the panoramic imaging system 30 shown in FIG. 2. Such wireless communication of data may occur using, for example, an 802.11x protocol (e.g., 802.11b protocol, 802.11g protocol), a Bluetooth protocol, one or more radio frequency channels, a wireless access protocol (WAP), a WiMAX protocol, and/or any other wireless transmission protocol.

Further, it is noted that there is no limitation on the number of separated video cameras that may be used in a particular panoramic imaging system. In other words, for example, although FIG. 2 shows the panoramic imaging system 30 as having six separated video cameras 32, 34, 36, 38, 40, 42, another panoramic imaging system may have eight separated video cameras, or, in one or more other embodiments, may have only four separated video cameras.

Also, there is no requirement that a panoramic imaging system in accordance with one or more embodiments be fully immersive. In other words, there is no limitation on the field of view that may be captured by the separated video cameras 32, 34, 36, 38, 40, 42. For example, in one or more embodiments, the desired panorama may span a full 360°, whereas, in one or more other embodiments, the desired panorama may have a field of view of 270°.

Still referring to FIG. 2, images captured by the separated video cameras 32, 34, 36, 38, 40, 42 are fed to a capture module 44 (use and operation of the capture module 44 further described below with reference to FIGS. 6-8). As used herein, the term "module" refers to any program, logic, and/or functionality that may be implemented in hardware and/or software. In general, the capture module 44 is capable of taking the raw images from the separated video cameras 32, 34, 36, 38, 40, 42 and storing the images in a particular type of or predetermined file format that is recognizable and processable by other components of the panoramic imaging system 30. In terms of identification, the image data from the separated video cameras 32, 34, 36, 38, 40, 42 may contain information specifying from which camera a particular stream of images has been captured. Moreover, in one or more embodiments, such identification may be made by associating captured images to a particular camera based on the port via which the captured images are received.

Further, in one or more embodiments, each stream of images from each of the separated video cameras 32, 34, 36, 38, 40, 42 may be stored in one file of the a predetermined file format. In other words, the capture module 44 may not have to somehow integrate the streams of images received from the separated video cameras 32, 34, 36, 38, 40, 42.

Further, it is noted that in one or more embodiments, the capture module 44 may input data streams and/or information other than that provided from the separated video cameras 32, 34, 36, 28, 40, 42. For example, the capture module 44 may input global positioning satellite (GPS) information, audio data (from a microphone), and/or other analog or digital data. Further, for example, the capture module 44 may input data from devices monitoring for radiation and/or chemicals. Such data may be associated with the images captured concurrently with the "other" data.

The capture module 44 is operatively connected to a data store 46 to which the capture module 44 provides the streams of images captured from the separated video cameras 32, 34, 36, 38, 40, 42. As described above, in one or more embodiments, the capture module 44, prior to delivery for storage in the data store 46, may convert the raw images captured from the separated video cameras 32, 34, 36, 38, 40, 42 into a predetermined file format (such a file format further described below with reference to FIG. 11). This conversion may involve adding information to the images captured by the separated video cameras 32, 34, 36, 38, 40, 42. For example, in one or more embodiments, the capture module 44 may add information to a stream of images captured by one of the separated video cameras 32, 34, 36, 38, 40, 42 to associate heading, pitch, and bank information for that stream of images.

Still referring to FIG. 2, the panoramic imaging system 30 includes a viewer module 48 (use and operation of the viewer module 48 further described below with reference to FIGS. 12-14). In general, the viewer module 48 is capable of visually rendering images captured by the separated video cameras 32, 34, 36, 38, 40, 42. As shown in FIG. 2, the viewer module 48 is operatively connected to the data store 46, and as such, in one or more embodiments, the viewer module 48 can take image stream files stored in the data store 48 and render them on some display (e.g., a computer monitor). Further, in one or more embodiments, the viewer module 48 is capable of directly rendering (i.e., without prior storage in the data store 48) the images captured by the separated video cameras 32, 34, 36, 38, 40, 42 in real-time. Further, it is noted that in one or more embodiments, there may be multiple viewer modules.

The viewer module 48 is further capable of integrating streams of images from the separated video cameras 32, 34, 36, 38, 40, 42 according to some set of information. For example, in one or more embodiments, the viewer module 48 may render panoramic video using data stored in accordance with a set of default settings specified by the capture module 44 upon image capture. These settings may, for example, make certain assumptions about the positioning of the separated video cameras 32, 34, 36, 38, 40, 42. For example, the default settings may assume evenly spaced, approximately 60° field-of-view lens images around a 360° panorama. Further, for example, the default settings specified by the capture module 44 may assume that the separated video cameras 32, 34, 36, 38, 40, 42 are ordered around the object in a clockwise manner. Further, it is noted that panoramic video may be displayed with various mixed-mode lens field-of-views.

In addition to being operatively connected to the viewer module 48, the data store 48 may also be operatively connected to a calibration module 50 (use and operation of the calibration module 50 further described below with reference to FIGS. 15-20). In general, the calibration module 50 offers a user the ability to modify the set of information by which the viewer module 48 renders images. More particularly, for example, the calibration module 50 provides a set of tools by which the user can access images from the data store 46, modify settings for the images in an effort to improve or otherwise change in some way how the images should be rendered (e.g., adjusting a height of an image, adjusting a field of view of an image, adjusting a horizontal axis of the image, adjusting a vertical axis of the image, adjusting optical parameters to remove and/or attenuate distortions).

As a result of modifying settings associated with images through use of the calibration module 50, information is added to the associated streams of images. The addition of such information is captured and possibly stored as calibration data in the predetermined file format discussed above. Thus, in one more embodiments, raw images from the separated video cameras 32, 34, 36, 38, 40, 42 are captured and stored in a predetermined file format, whereupon those images may then later be rendered according to calibration data resulting from image modifications made using the calibration module 50. As such, the viewer module 48 is then further capable of visually rendering images in accordance with either data in the predetermined file format or with both the predetermined file format and calibration data.

The various separated video cameras 32, 34, 36, 38, 40, 42 and modules 44, 46, 48, 50 of the panoramic imaging system 30 described above with reference to FIG. 2 are described as being "operatively connected." In general, two components in the panoramic imaging system 30 may be operatively connected either via wire or wirelessly (or both). For example, the capture module 44 may wirelessly communicate captured image data to the data store 46. Moreover, in one or more embodiments, the capture module 44 and the data store 46 may communicate over a data bus (in the case, for example, the capture module 44 and the data store 46 are resident on the same machine). Further, in one or more embodiments, one or more of the viewer module 48 and the calibration module 50 may wirelessly communicate data with the data store 46. Moreover, in one or more embodiments, the viewer module 4 may be operatively connected to the capture module 44 such that the viewer module 48 can directly render images as they are captured by the capture module (instead of, for example, retrieving captured images as they are stored in the data store 46).

Figure 3:
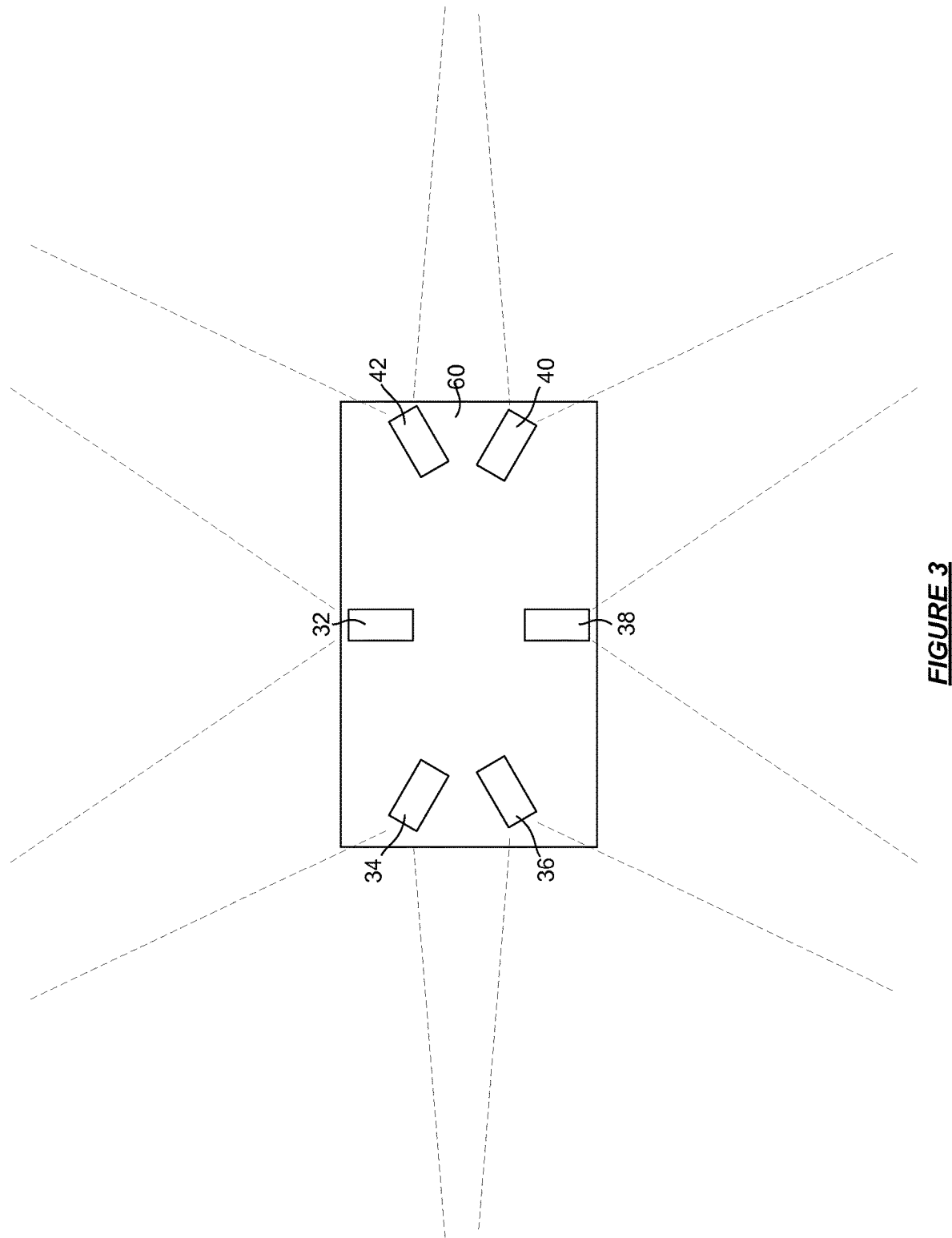
FIG. 3 shows a video camera arrangement for a panoramic imaging system in accordance with an embodiment of the present invention.

FIG. 3 shows an example of an arrangement of the separated video cameras 32, 34, 36, 38, 40, 42 around the inside of an object 60 (as opposed to on a fixed head 24 as shown in FIG. 1), where, here, the object is a vehicle. Further, it is noted that although the separated video cameras 32, 34, 36, 38, 40, 42 may appear in FIG. 3 as being uniformly or evenly distributed, there is no such requirement per se. In fact, even distribution may often not be possible due to, for example, obstructions in the object 60.

Figure 4:
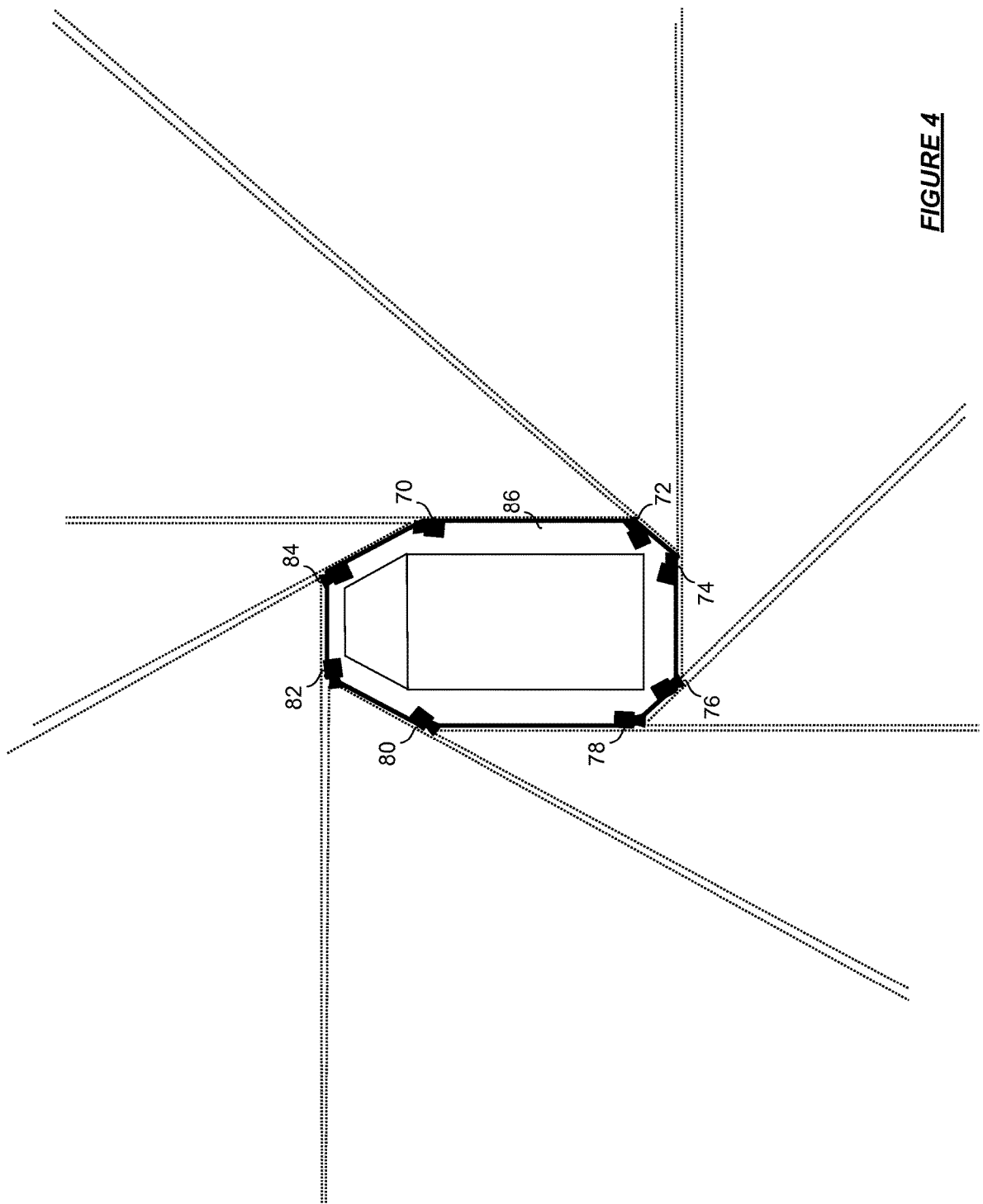
FIG. 4 shows a video camera arrangement for a panoramic imaging system in accordance with an embodiment of the present invention.
Figure 5:
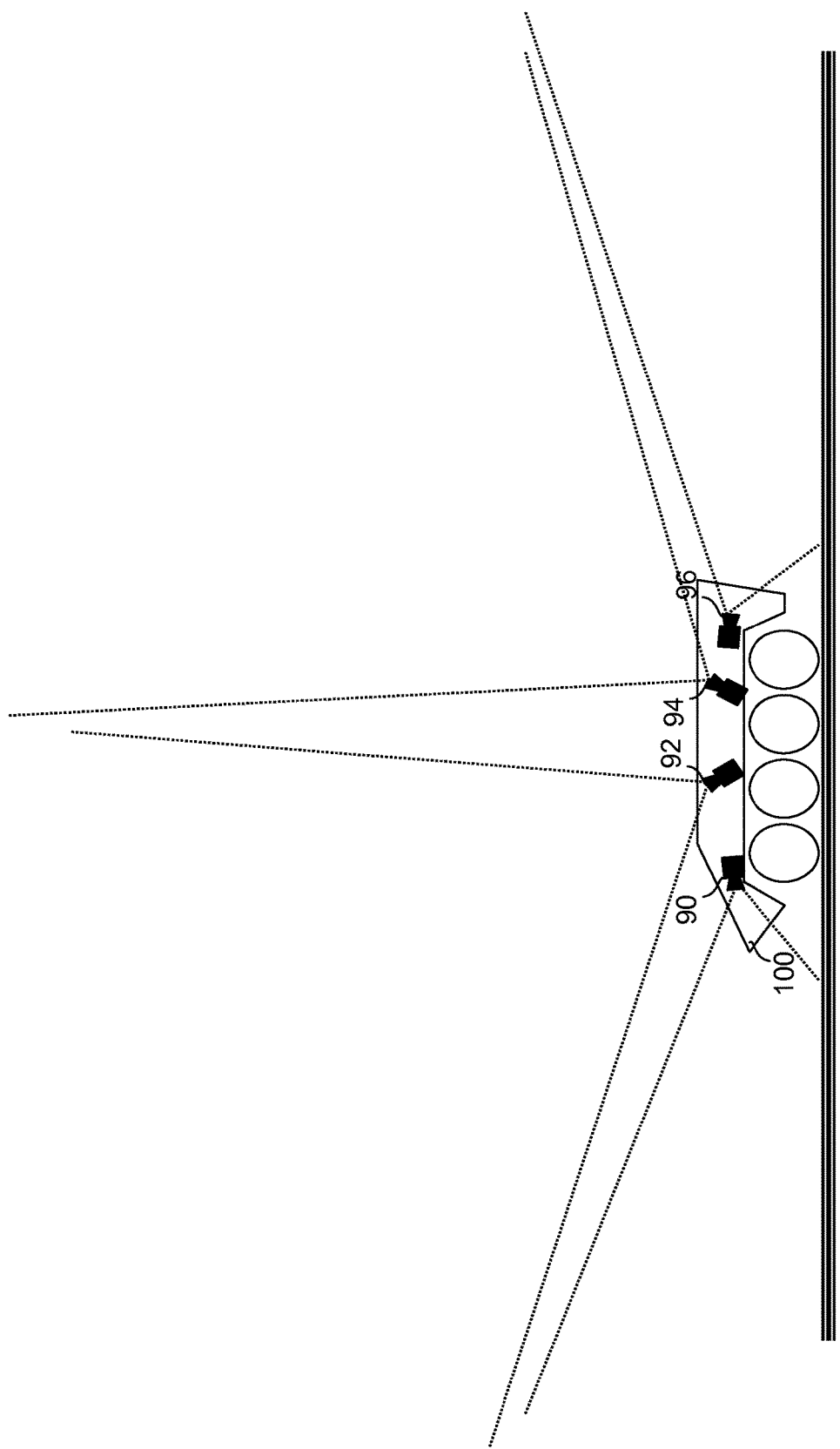
FIG. 5 shows a video camera arrangement for a panoramic imaging system in accordance with an embodiment of the present invention.

FIG. 4 shows another example of an arrangement of separated video cameras. Here, eight separated video cameras 70, 72, 74, 76, 78, 80, 82, 84 are distributed around a vehicle 86. The arrangement shown in FIG. 4 may be particularly useful for applications in which the object has a number of distinct vertices. Further, in one or more embodiments, it may be desirable to obtain scene data having a large vertical field of view (in addition to or instead of a wide horizontal field of view). Accordingly, as shown in FIG. 5, separated video cameras 90, 92, 94, 96 may be distributed around a vehicle 100 to capture images of a large vertical field of view. Moreover, it is noted that both cameras for horizontal fields of view and vertical fields of view may be distributed around (either interiorly or exteriorly) around an object. In other words, for example, one or more cameras having the orientations shown in FIG. 5 may be distributed around an object in addition to one or more cameras having the orientations shown in FIGS. 3 and/or 4. Moreover, it is noted that both cameras for horizontal fields of view and vertical fields of view may be distributed around (either interiorly or exteriorly) around an object. In other words, for example, one or more cameras having the orientations shown in FIG. 5 may be distributed around an object in addition to one or more cameras having the orientations shown in FIGS. 3 and/or 4.

As discernible from the arrangement of the separated video cameras 32, 34, 36, 38, 40, 42 shown in FIG. 3, an initial positioning of the separated video cameras 32, 34, 36, 38, 40, 42 in the vehicle 60 may not be conducive to optimal or desired panoramic imaging. Thus, in one or more embodiments, various camera alignment techniques may be used to adjust the separated video cameras 32, 34, 36, 38, 40, 42 prior to actual image capture.

Figure 6:
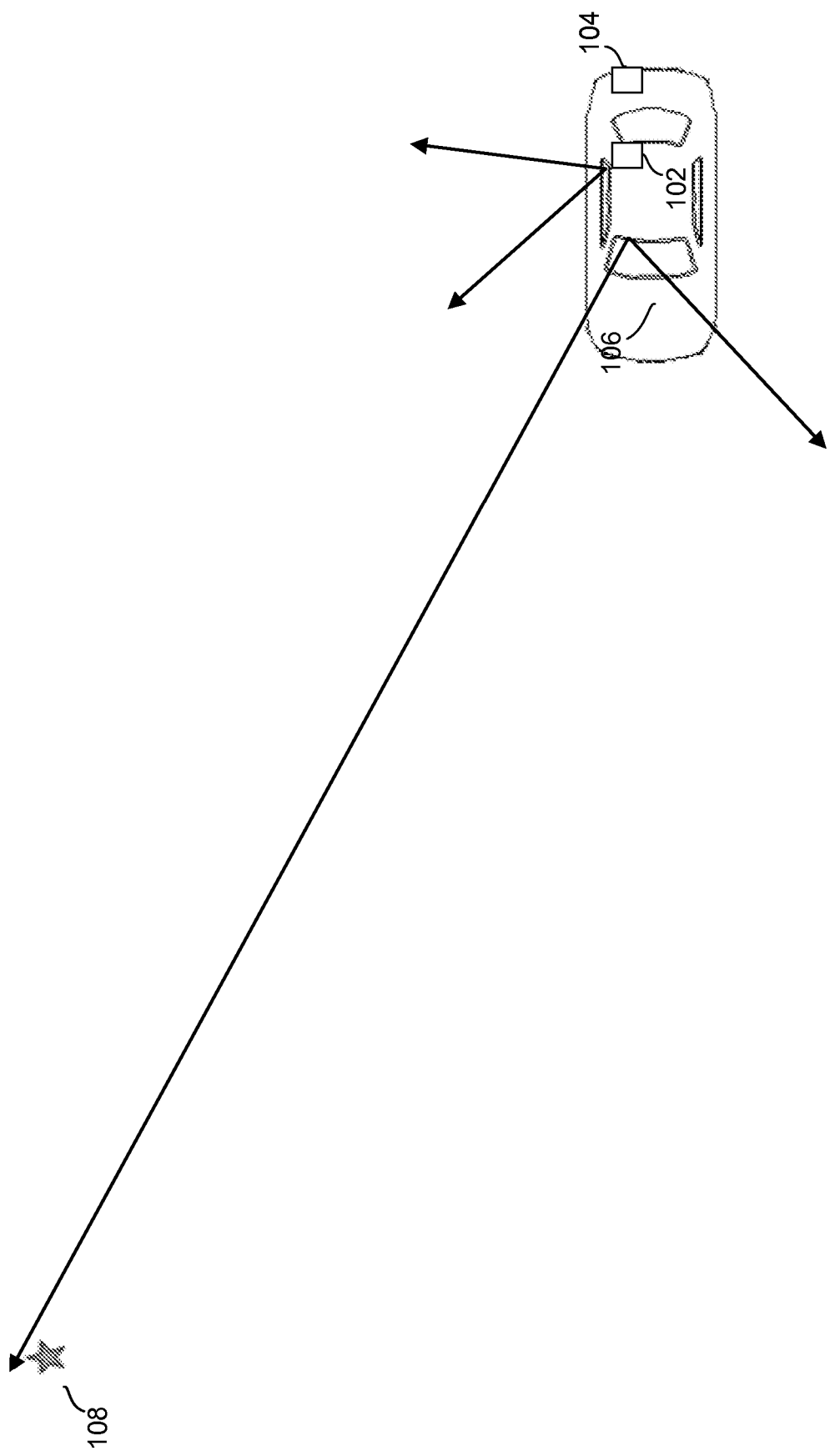
FIG. 6 shows an alignment technique for a panoramic imaging system in accordance with an embodiment of the present invention.
Figure 7:
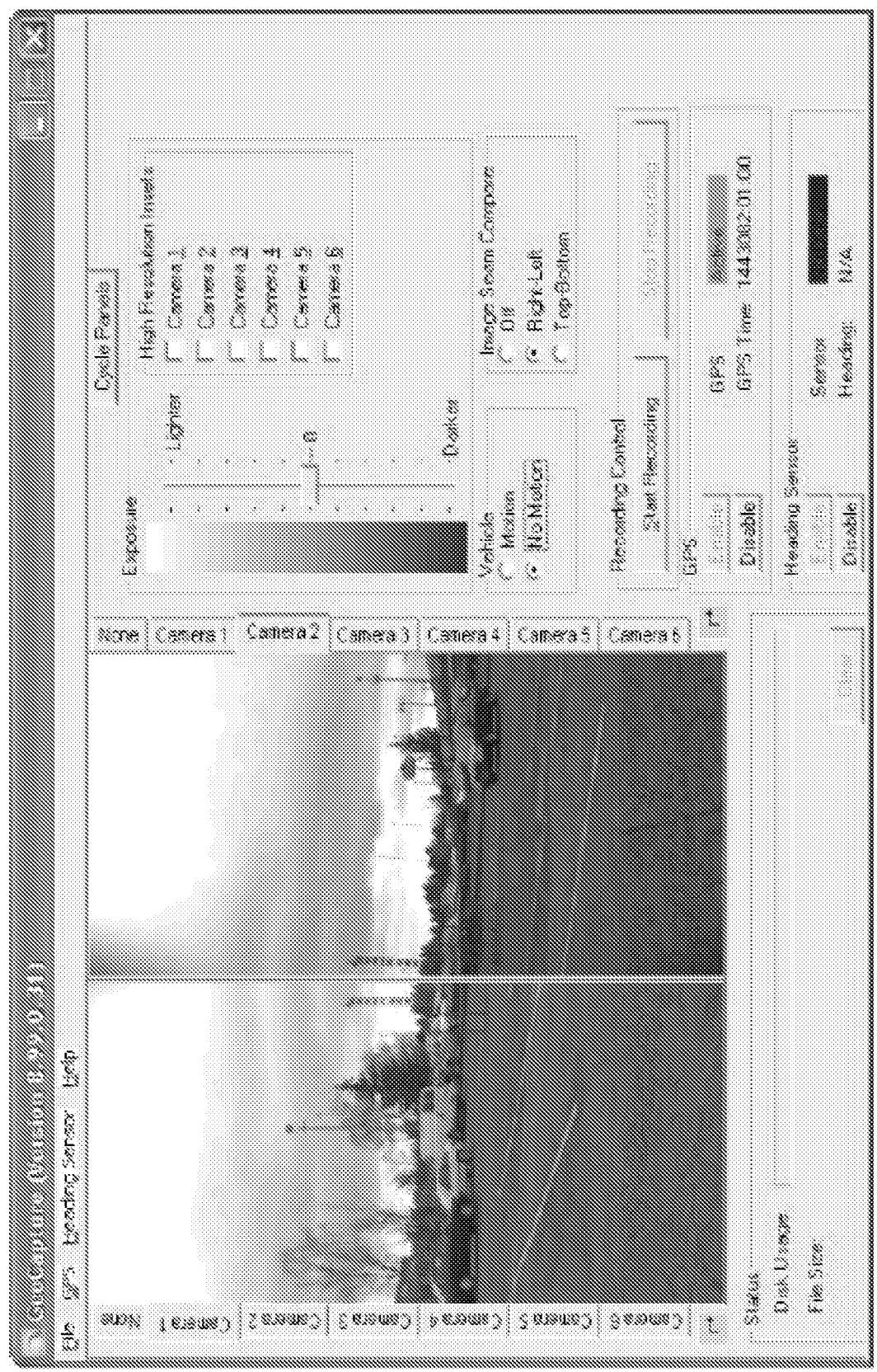
FIG. 7 shows a screenshot associated with use of a capture module for a panoramic imaging system in accordance with an embodiment of the present invention.

Now referring to FIG. 6, it shows an example of a step of a camera alignment technique in accordance with an embodiment of the present invention. As shown in FIG. 6, initially, a first separated video camera 102 is secured inside a vehicle 106. Once the first separated video camera 102 has been secured, the vehicle 106 may be been positioned (e.g., turned) such that some exterior object (e.g., a light pole, a building, a tower) 108 aligns with a right edge of the first separated video camera's 102 field of view.

In one or more embodiments, the determination of when a right edge of the first separated video camera's 102 field of view is aligned with object 108 may be made using the capture module 44. For example, now also referring to FIG. 7, a screenshot of a use of the capture module 44 shows the field of view of each separated video camera. Thus, the capture module 44 may be used to monitor the field of view of the first separated video camera 102 while the vehicle 106 is adjusted in the effort to align object 108 as described above.

Figure 8:
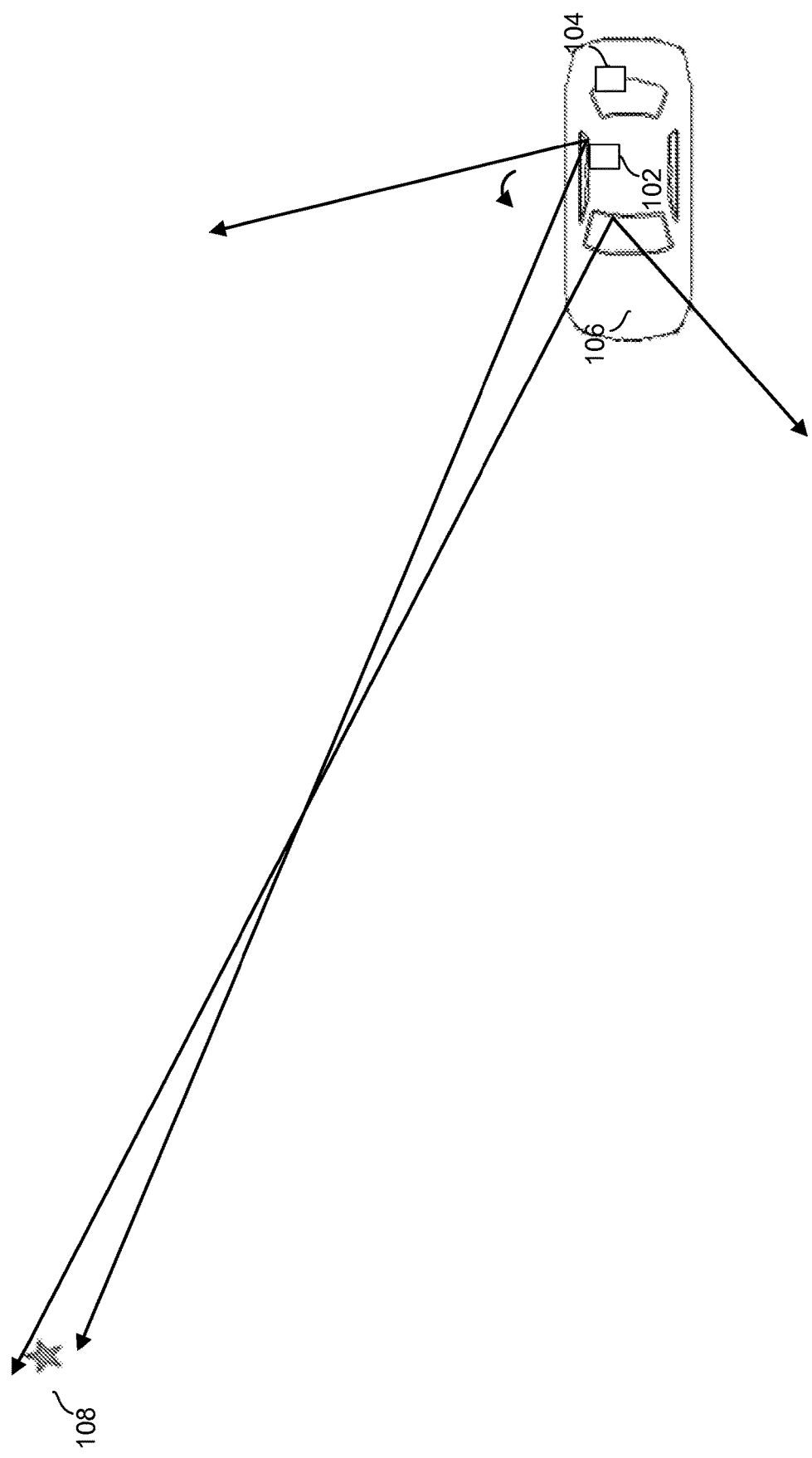
FIG. 8 shows an alignment technique for a panoramic imaging system in accordance with an embodiment of the present invention.

Now also referring to FIG. 8, after the first separated video camera 102 has been secured as described above with reference to FIGS. 6 and 7, a second separated video camera 104 may be adjusted in an effort to align object 108 with a left edge of the second separated video camera's 104 field of view. In one or more embodiments, such adjustment may actually require positioning (e.g., turning) of the vehicle 106 itself. Like with the first separated video camera 102, the capture module 44 may be used to monitor the field of view of the second separated video camera 104 as the camera 104 is adjusted for alignment with object 108. Once aligned, the second separated video camera 104 may then be secured.

Each remaining separated video camera (not shown) in the vehicle 106 is aligned similarly to how the first and second separated video camera 102, 104 were aligned (i.e., each in turn with its neighbor) as described above with reference to FIGS. 6-8. Once all the separated video cameras in the vehicle 106 are aligned and secured, subsequent image capture will result in a panoramic image capture (as opposed to a potentially non-ideal, non-optical, or otherwise undesirable panoramic image capture using separated video cameras 32, 34, 36, 38, 40, 42 that are not aligned as shown in FIG. 3).

As described above with reference to FIGS. 6-8, separated video cameras 102,104 may be adjusted and secured. In general, the separated video cameras 102, 104 may be mechanically connected in an interior region of the vehicle 106 in any way, so long as the separated video cameras 102, 104 can reliably capture images from a selected position. Particularly, in one or more embodiments, one or more of the separated video cameras 102, 104 may be distributed within the vehicle 106 using, for example, a suction cup, a mounting bracket, screws, and/or other types of affixing devices. Adjustment of one or more of the separated video cameras 102, 104 may involve adjusting and securing a position of the cameras 102, 104 by, for example, turning a screw-based knob, physically adjusting a mounting bracket, and/or otherwise physically moving the cameras 102, 104. Moreover, it is noted that in one or more embodiments, adjustment of one or more of the separated video cameras 102, 104 may be automated as opposed to or in addition to having a manual adjustment control. For example, one or more of the separated video cameras 102, 104 may be operatively coupled to a motor that can be used to adjust a position of the video camera. It is noted that control of the motor, in one or more embodiments, may be dynamic, i.e., may occur while the associated separated video camera(s) is/are actively capturing images.

Additionally, in one or more embodiments, one or more separated video cameras may be positioned on an exterior region of an object. For example, because certain objects may not have a window or other open or transparent region through which interiorly positioned cameras can capture exterior images, one or more separated video cameras may be exteriorly secured to a body of the object. Accordingly, where separated video cameras are described herein as being positioned or disposed "around an object," the positioning of one or more separated video cameras may be in an interior region or an exterior region of the object.

Further, it may be desirable to perform an alignment of separated video cameras indoors. For example, due to poor weather conditions or lack of visible landmarks/fixtures for alignment, a user may instead perform effective video camera alignment in an at least partially enclosed area (e.g., a garage). Such indoor alignment may be performed, for example, with lasers. For example, now referring to FIG. 9, it shows a step in an indoor alignment technique using lasers. Borders 130 around vehicle 132 represent garage walls. The two sets of arrows roughly 60° apart represent the fields of view for a first separated video camera (not shown, but represented as being located at the vertex 133 of one set of the shown arrows) and a second separated video camera (not shown, but represented as being located at the vertex 135 of one set of the shown arrows). For purposes of understanding, an object 134 is shown to represent a would-be position of a hypothetical distant object (as described above with reference to the alignment technique shown in FIGS. 6-8). Lines 136, 138 represent lasers emanating from laser sources positioned at points 140, 142, respectively. Further, it is noted that the distance between the parallel laser lines 136, 138 may be adjusted.

Figure 9:
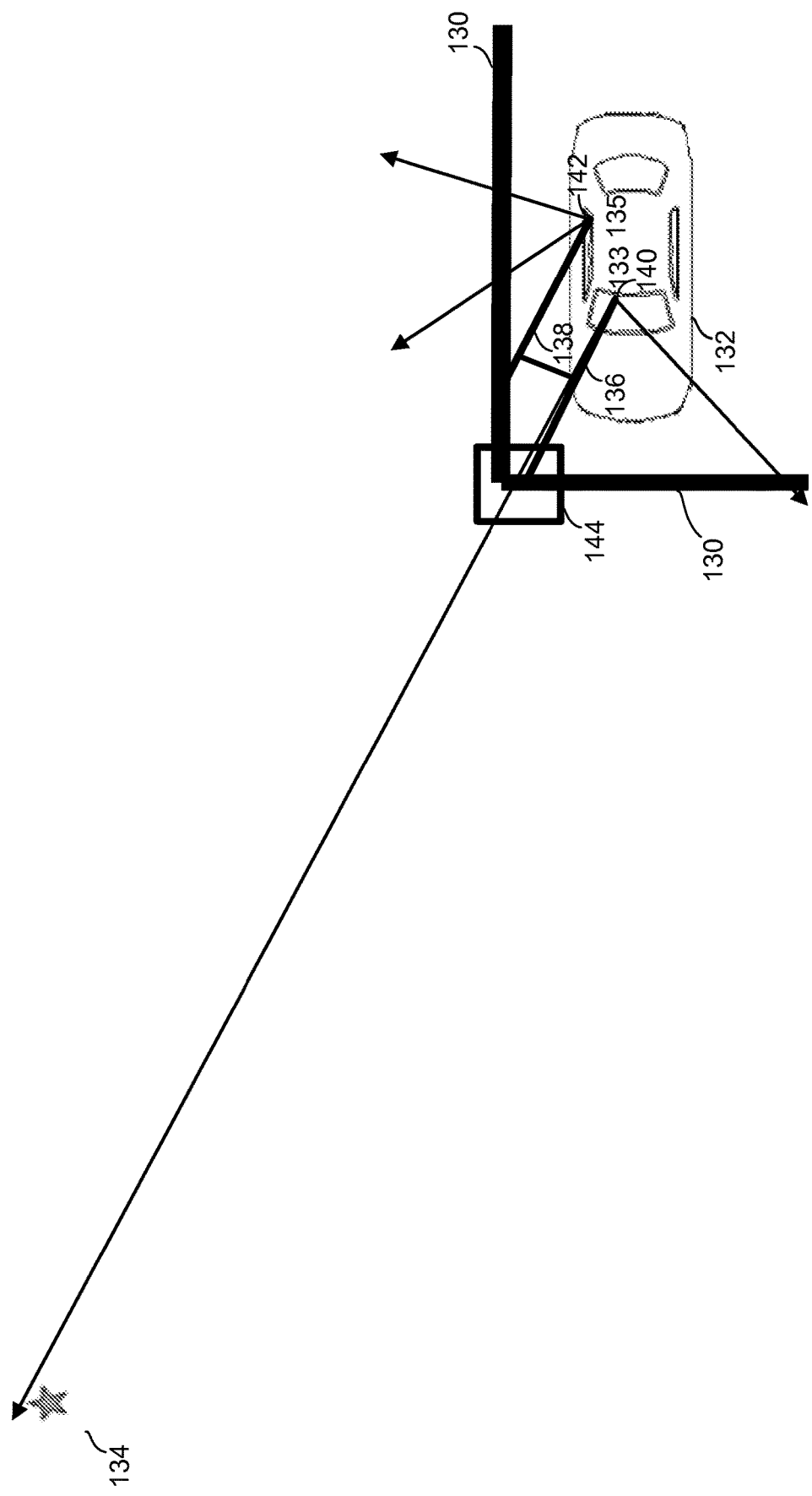
FIG. 9 shows an alignment technique for a panoramic imaging system in accordance with an embodiment of the present invention.

Still referring to FIG. 9, the first separated video camera positioned at vertex 133 is adjusted so that the laser source positioned at point 140 shoots a laser in a right edge of the field of view of the separated video camera positioned at vertex 133. Such alignment is shown in box 144. Once the desired alignment is achieved, the first separated video camera positioned at vertex 133 may be secured.

Figure 10:
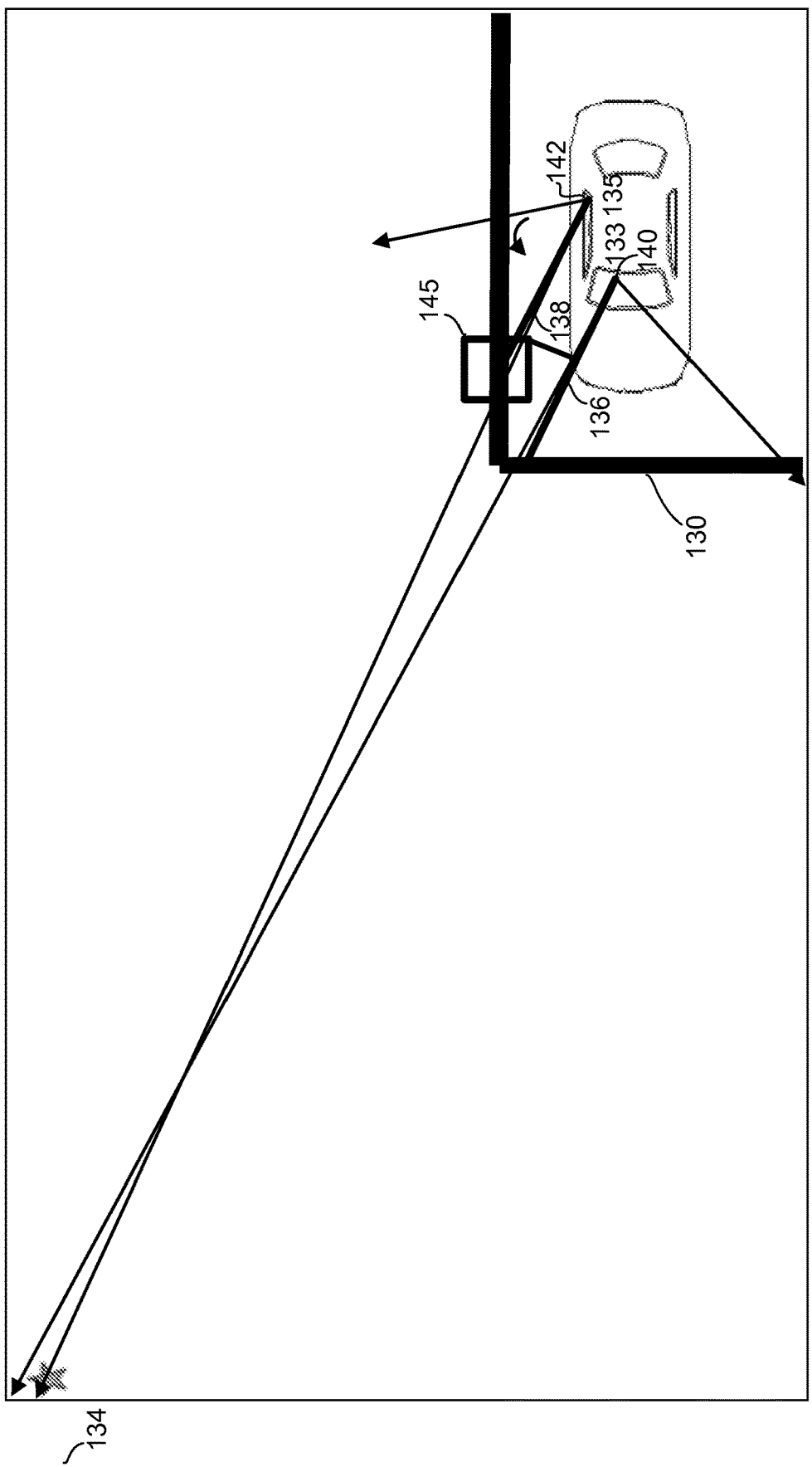
FIG. 10 shows an alignment technique for a panoramic imaging system in accordance with an embodiment of the present invention.

Now referring to FIG. 10, the second separated video camera positioned at vertex 135 is adjusted so that the laser source positioned at point 142 shoots a laser in a left edge of the field of view of the separated video camera positioned at vertex 135. Such alignment is shown in box 145. Once the desired alignment is achieved, the second separated video camera positioned at vertex 135 may be secured.

The indoor alignment process described above with reference to FIGS. 9 and 10 may be repeated for additional separated video cameras. Accordingly, using the indoor alignment technique described above with reference to FIGS. 9 and 10, when the vehicle 132 is subsequently taken outdoors for capturing images, the camera alignment facilitates, at some distance from the vehicle 132, fully immersive panoramic imaging as represented by the overlapping extended arrows 146, 148 shown in FIG. 10.

As described above with reference to FIG. 2, images taken by separated video cameras 32, 34, 36, 38, 40, 42 (e.g., 70, 72, 74, 76, 78, 80, 82, 84 in FIG. 4; 90, 92, 94, 96 in FIG. 5; 102, 104 in FIGS. 6 and 8) are outputted by the separated video cameras 32, 34, 36, 38, 40, 42 to the capture module 44 in some native, or raw, format. For example, the raw images from the separated video cameras 32, 34, 36, 38, 40, 42 may be in a JPEG file format, a GIF file format, or an MPEG file format. Further, it is noted that images may be received in uncompressed format. The capture module 44 takes the raw images and converts them into a particular file format for subsequent storage in the data store 46.

Further, in one or more embodiments, a set of the separated video cameras 32, 34, 36, 38, 40, 42 may be supplemented with one or more "high-resolution" separated video cameras. Such a camera is designated "high-resolution" if the resolution at which it captures image data is higher than at which the separated video cameras 32, 34, 36, 38, 40, 42 capture image data. As described in further detail below with reference to FIGS. 12-14, in one or more embodiments, one or more high-resolution cameras may be used for inserting high-resolution images in a panoramic scene captured by the separated video cameras 32, 34, 36, 38, 40, 42.

Figure 11:
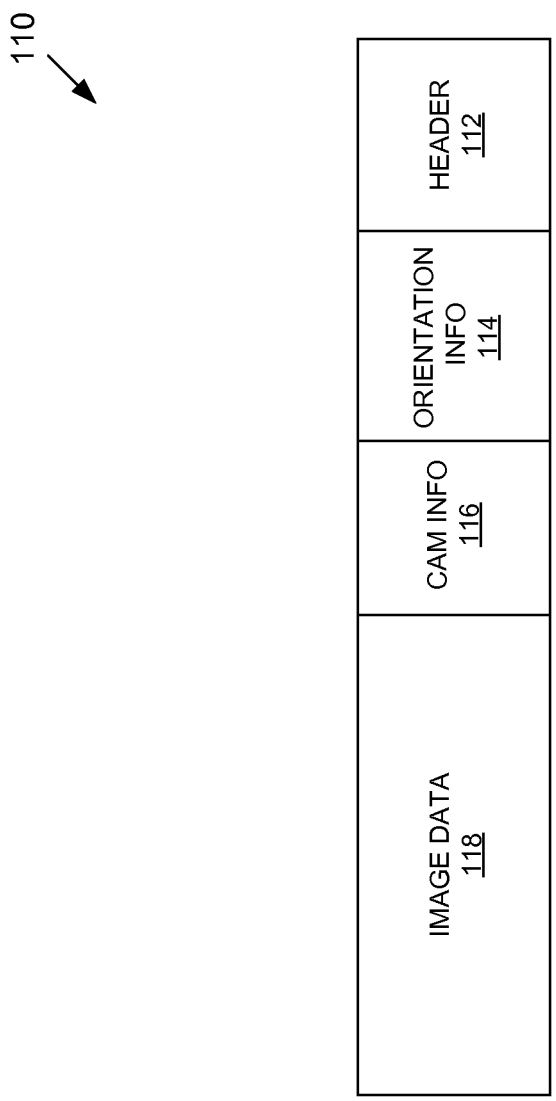
FIG. 11 shows a file format for use in a panoramic imaging system in accordance with an embodiment of the present invention.

FIG. 11 shows an example of an arrangement of a file format that may be used for conversion from raw image data in accordance with an embodiment of the present invention. Particularly, FIG. 11 shows a representative frame 110 in accordance with the file format for an individual image captured by one of the separated video cameras 32, 34, 36, 38, 40, 42. It is important to note that the image data (further described below) contains multiple image frames, whereas in an image-frame context, it may contain only a single image frame.

The frame 110, at a first portion thereof, includes a header 112. The header portion 112 has identification information uniquely identifying frame 110 (e.g., in timing relation to other image frames (not shown)). In one or more embodiments, the header information 112 may also have metadata describing the data contained in the frame 110.

The image frame 110 further includes an orientation data portion 114. This portion 114 includes information relating to a heading, a pitch, and/or a bank of the image associated with frame 110. In general, in one or more embodiments, such information is set by the capture module 44.

Still referring to FIG. 11, the image frame 110 may further include a camera data portion 116. The camera data portion 116 includes information about the particular separated video camera used to capture the image associated with frame 110. For example, the camera data portion 116 may specify that the image associated therewith was taken by separated video camera 34 having a resolution of 1280×960 pixels. Those skilled in the art will note that various other types of information may be specified in the camera data portion 116 (e.g., type of camera used, shutter speed, zoom position).

The image frame 110 also includes the image data 118 itself. As described above, in one or more embodiments, the image data may be in the form of a JPEG file, a GIF file, a MPEG file, or any other digital image format. Those skilled in the art will note that image data 118 likely constitutes the largest portion of frame 110. Further, it is noted that the arrangement of data shown in FIG. 11 is not limiting; the data may be arranged in any order.

Now more specifically referring to an embodiment of the file format described above with reference to FIG. 11, the file format may be designed to be a generic holder of streams of binary data, synchronized to a common clock. The data is encapsulated in packets, with each packet denoting which stream it is data for, and where it should be placed on a timeline. Random access to the data within the file is limited to random access to each packet of data and is facilitated by a table of contents (TOC), which is encoded in a special TOC packet in the file. The TOC entries contain the offset within the file to where the packet is stored as well as other information about the packet.

Each packet in the file may contain a header and payload data. The header contains redundant information sufficient to regenerate the complete TOC entry for that packet and the size of the payload data for the packet.

Time-synchronized metadata may be an important feature of video, and thus, the file format may natively support a generic encoding of metadata. The data may be encoded as a set of related information: <length of string key, string key, type of value, length of value data, value data>. Special "KLV" packets may be read and written that contain an arbitrary number of these sets.

Meta information about the contents of each stream may be required for understanding the content of the file, and thus, the file format may support a special stream header packet that may be read and written to for each stream. The stream header packets may be a special case of metadata, and thus, "KLV" metadata packets may be used to contain this data as well. Further, when placed into the file, a special time code on the timeline (e.g., −1) may be used to denote the packet as a stream header packet.

Because of the random access capability and tracking of the packet along a common timeline, packets may be written to a file in any desired order and read back in a completely different order. Thus, while there may be a typical ordering of packets in a file, any ordering may be used.

Further, in one or more embodiments, file editing is supported by packet replacement. The headers of deleted packets may be overwritten with special information so they will not reappear if the file is rescanned to rebuild the TOC. New packets are appended at the end of the file, and a new TOC packet written after may then reference the active packets in the file.

As described above, the panoramic imaging system 30 may use the file format described above with reference to FIG. 11 to store its data. In one or more embodiments, the system 30 may create the following streams in the file to hold the data: file metadata—holds per-file metadata; video stream (camera 1)—holds video data for camera 1; video stream (camera 2)—holds video data for camera 2; video stream (camera 3)—holds video data for camera 3; video stream (camera 4)—holds video data for camera 4; video stream (camera 5)—holds video data for camera 5; video stream (camera 6)—holds video data for camera 6; attitude data stream—holds attitude data; horizon stream holds artificial horizon settings; GPS stream—holds GPS coordinates recorded during the collect; capture time stream—holds time each frame was recorded; calibration stream—holds override calibration (each video stream may contain calibration that describes how and where they are presented on the immersive view) (this stream may override the calibration from other video streams); color balance stream (camera 1)—holds color balance settings for video data from camera 1; color balance stream (camera 2)—holds color balance settings for video data from camera 2; color balance stream (camera 3)—holds color balance settings for video data from camera 3; color balance stream (camera 4)—holds color balance settings for video data from camera 4; color balance stream (camera 5)—holds color balance settings for video data from camera 5; color balance stream (camera 6)—holds color balance settings for video data from camera 6; compass declination stream—holds compass magnetic declination values to be applied to the attitude data; app metadata—holds metadata about the application and user that recorded the file; user data stream—arbitrary binary user data; and user metadata stream—arbitrary user metadata. It is noted that not all of these fields/streams may exist for a given file.

As described above with reference to FIG. 2, the viewer module 48 is capable of visually rendering images in real-time and/or using data stored in the data store 46. At least in one aspect, the viewer module 48 creates (or has preprogrammed) a wire frame for rendering incoming images. Particularly, for example, the viewer module 48 may be capable of visually rendering images stored according to the file format described above with reference to FIG. 11 (and/or with calibration data described in further detail below with reference to FIG. 21).

Figure 12:
FIG. 12 shows a screenshot associated with use of a viewer module for a panoramic imaging system in accordance with an embodiment of the present invention.
Figure 13:
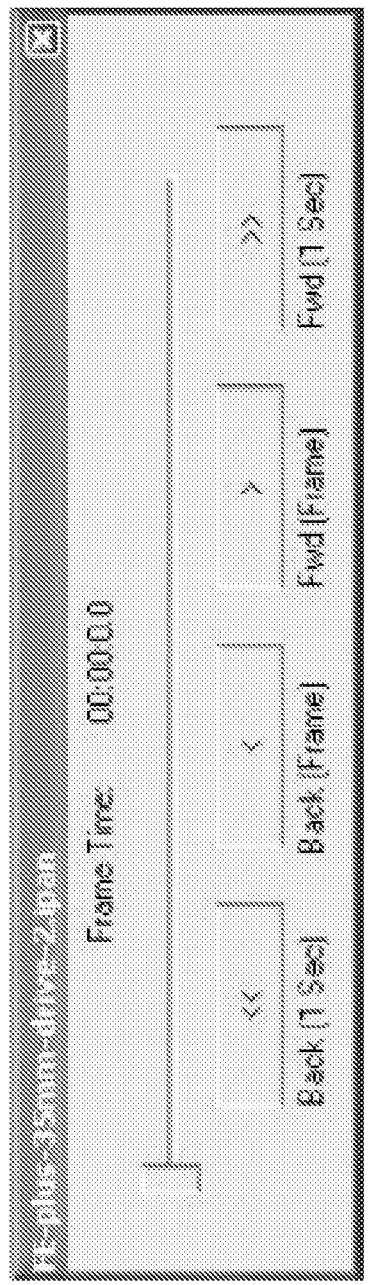
FIG. 13 shows a screenshot associated with use of a viewer module for a panoramic imaging system in accordance with an embodiment of the present invention.

FIG. 12 shows an example of a screenshot rendered by the viewer module 48 in accordance with an embodiment of the present invention. As described above, in one or more embodiments, the viewer module 48 may be used to render captured images in real-time (e.g., virtually simultaneously rendered from the data store 46 as images are deposited in the data store 46 by the capture module 44). Further, in one or more embodiments, the viewer module 48 may be used to render capture images in a non-real-time manner. For example, as shown via the control user interface in FIG. 13, a user can select a particular image frame to view. Particularly, for example, an image frame may be selected based on a timing relation to a currently displayed frame (e.g., go back 1 second, go back 1 frame, go forward 1 second, go forward 1 frame). In still another example, an image frame may be selected for display by simply choosing a time of interest (e.g., as shown in FIG. 13, via use of the frame time scroll bar).

Figure 14A:
FIGS. 14A and 14B show screenshots associated with use of a viewer module for a panoramic imaging system in accordance with an embodiment of the present invention.
Figure 14B:
Figure 15:
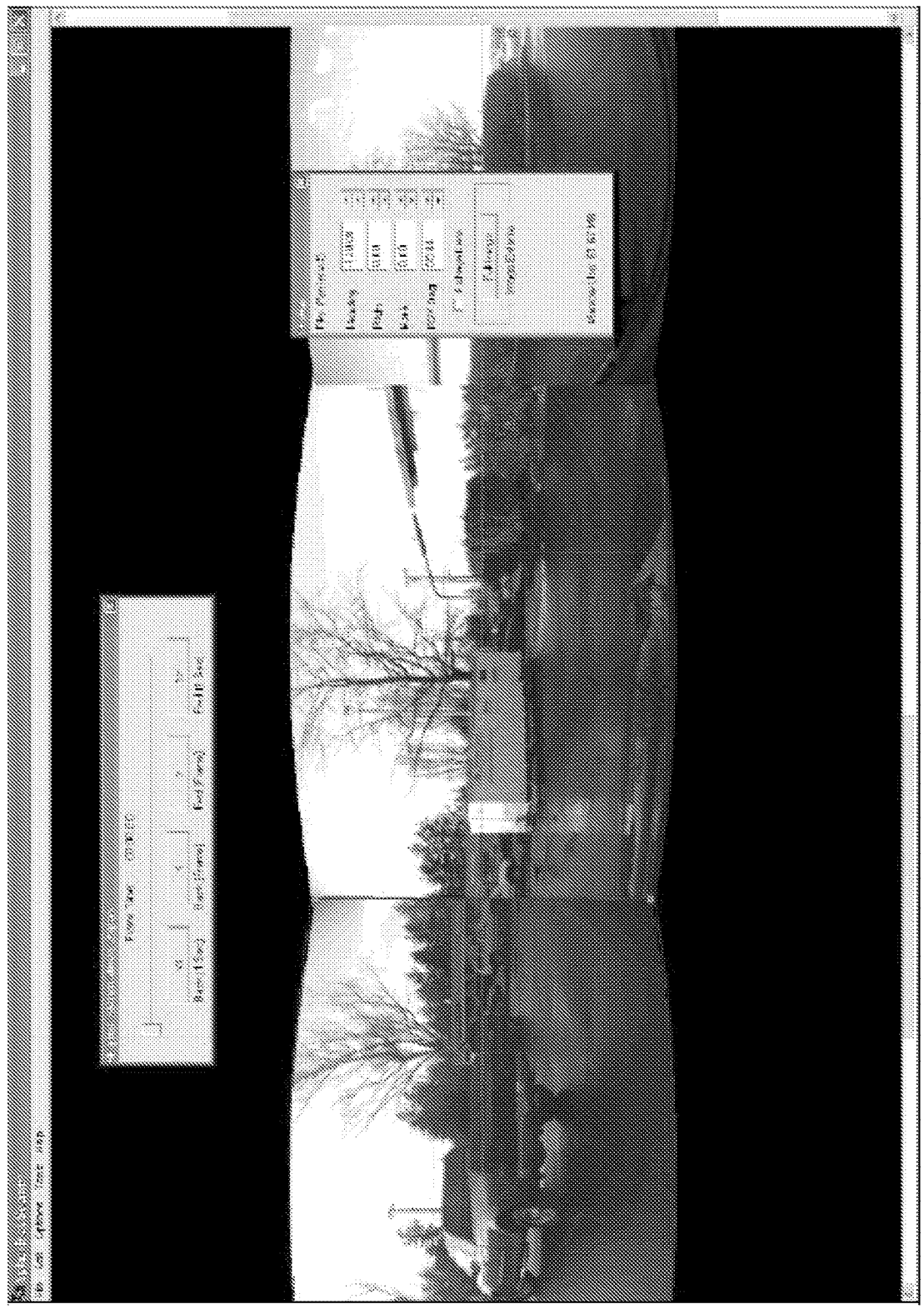
FIGS. 15-20 show screenshots associated with use of a calibration module for a panoramic imaging system in accordance with an embodiment of the present invention.

Now referring to FIGS. 14A and 14B, in one or more embodiments, the viewer module 48 may render a high-resolution insert image with one or more of the rendered captured images. Particularly, in FIG. 14A, the high-resolution insert image is positioned on the location of the actual object desired to be viewed in high-resolution. In FIG. 14B, the high-resolution insert image may be offset or displaced from the actual location of the object in order to, for example, maintain situational awareness that otherwise might be lost if and when zooming in on the actual location of the object. Moreover, in one or more embodiments, the high-resolution insert image may actually be selected (e.g., dragged to a particular location on a screen) for operation in its own window.

As described above, a high-resolution insert image has a higher resolution than that of at least one other image captured with a non-high-resolution separated video camera. Particularly, for example, the viewer module 48 may overlay a high-resolution insert image over an image captured with a non-high-resolution separated video camera. Use of a video camera to capture a high-resolution image may be useful, for example, in cases where it is desirable to have a clearer view (e.g., clearer as the high-resolution image is zoomed in on) of a particular area or region in the field of view of a panoramic imaging system in accordance with one or more embodiments. Further, by selecting an area for which high-resolution images are desired (as opposed to, for example, capturing high-resolution images for an entire panoramic scene), less memory space may be consumed. Moreover, it is noted that the viewer module 48 may leverage specific capabilities of, for example, a graphics card, to render high-resolution insert images.

Further, in regard to a high-resolution insert image, it is noted that it may not be necessary to use a high-resolution camera to obtain such an image. The high-resolution insert image may not be higher in absolute resolution (e.g., raw pixels), but may cover a small portion of the immersive view with a higher pixel density (i.e., more pixels per degree). For example, in one or more embodiments, 1600×1200 resolution cameras may be used to cover the full immersive view, and a 640×480 resolution camera (with a long focal length lens) may be used to cover only a small portion of that overall immersive view. Thus, whereas the 1600×1200 resolution cameras may only cover the region that the 640×480 resolution camera sees with 1000 pixels, the 640×480 resolution camera may cover the same region with—1 million pixels.

Referring again to FIG. 2, the calibration module 50 may be used to adjust how images are ultimately rendered by the viewer module 48. The calibration module 50 offers a variety of different tools by which a user can modify captured image settings. In general, the calibration module 50 may be thought of as being using to "build a scene" by desirably aligning images captured by the separated video cameras 32, 34, 36, 38, 40, 42.

FIGS. 15-20 show examples of various screenshots of the calibration module 50, the depictions of which illustrate how captured image settings may be modified. Particularly, FIG.

Figure 16:
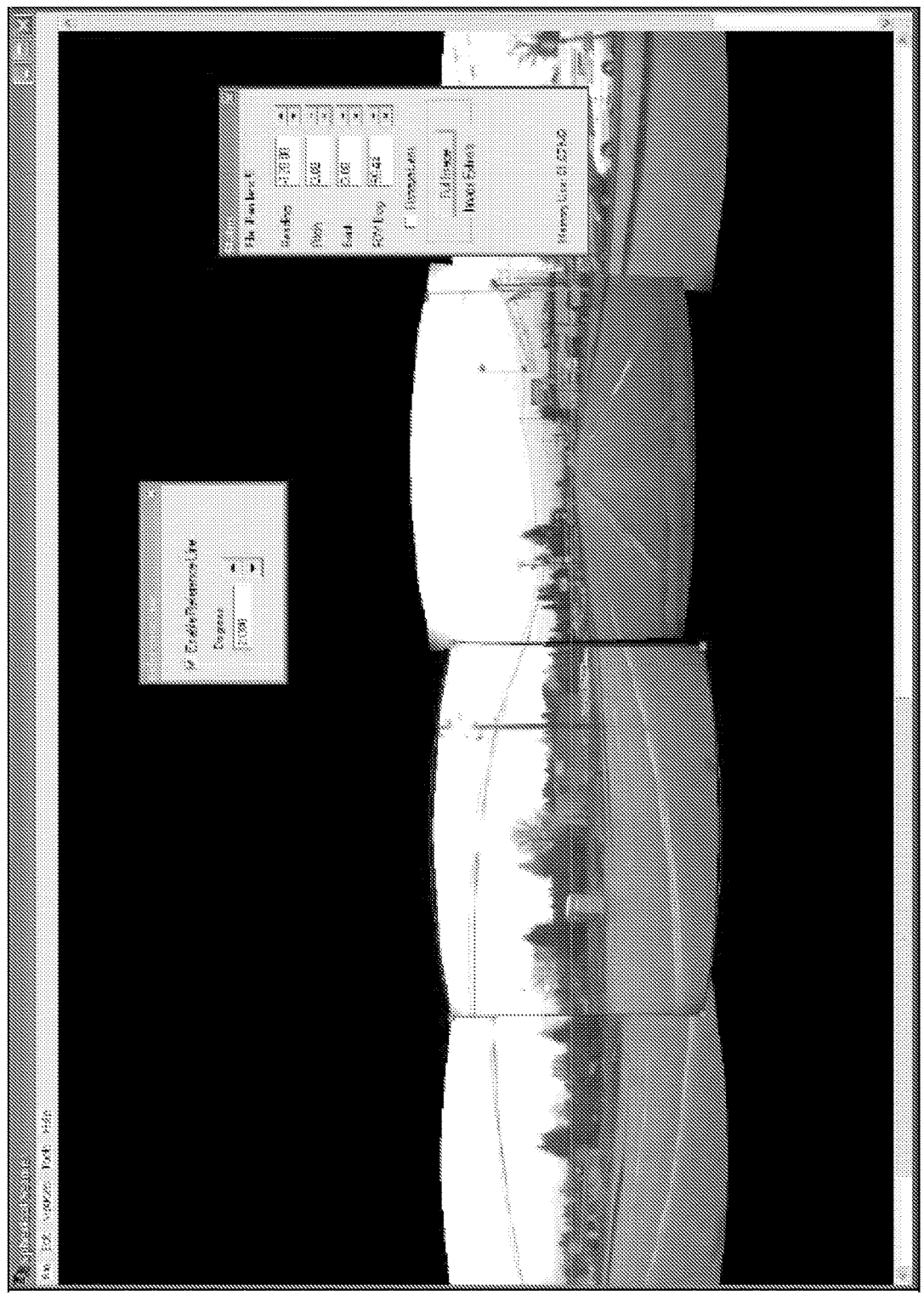
Figure 17:
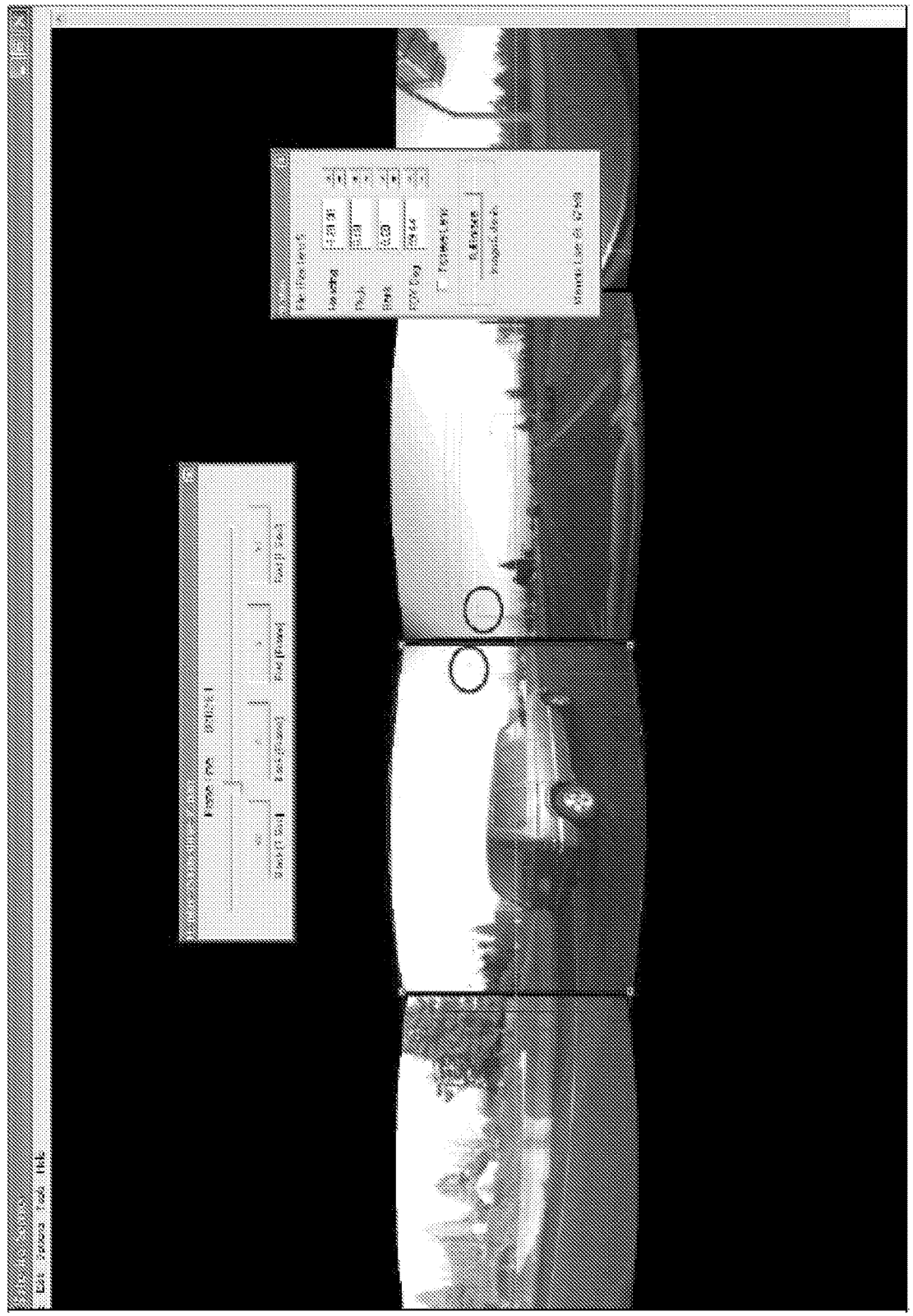
Figure 18:
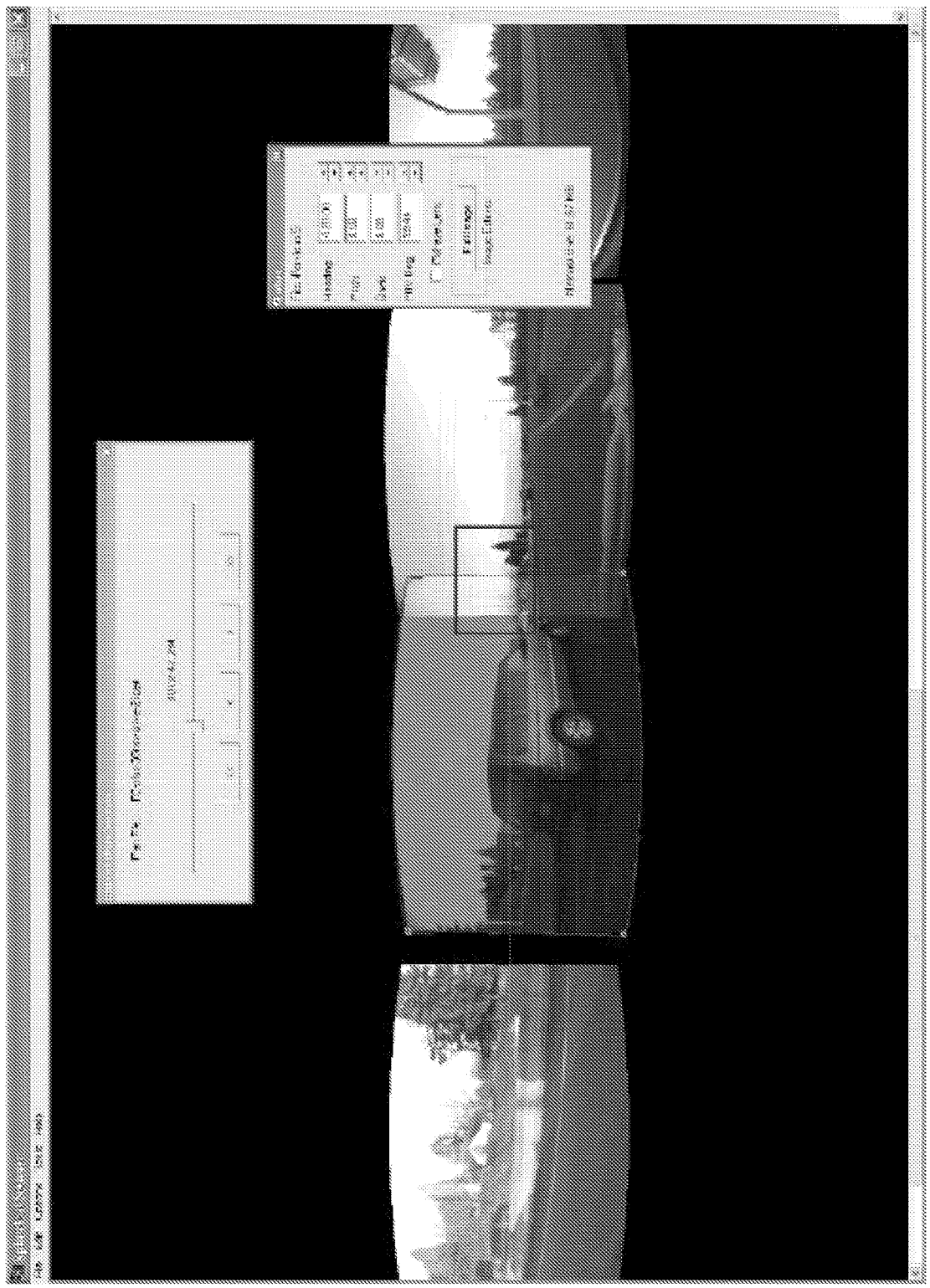
Figure 19:
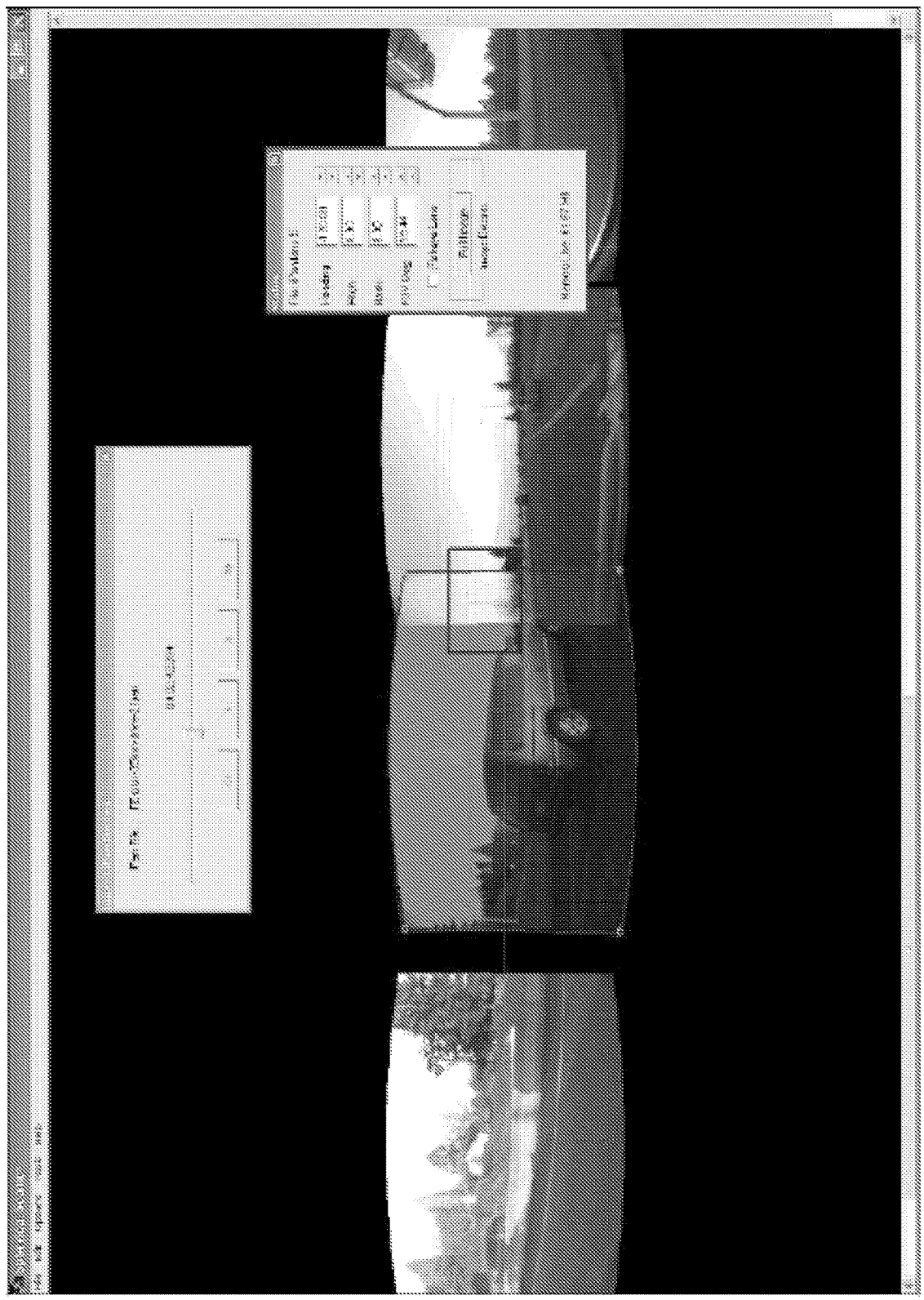
Figure 20:
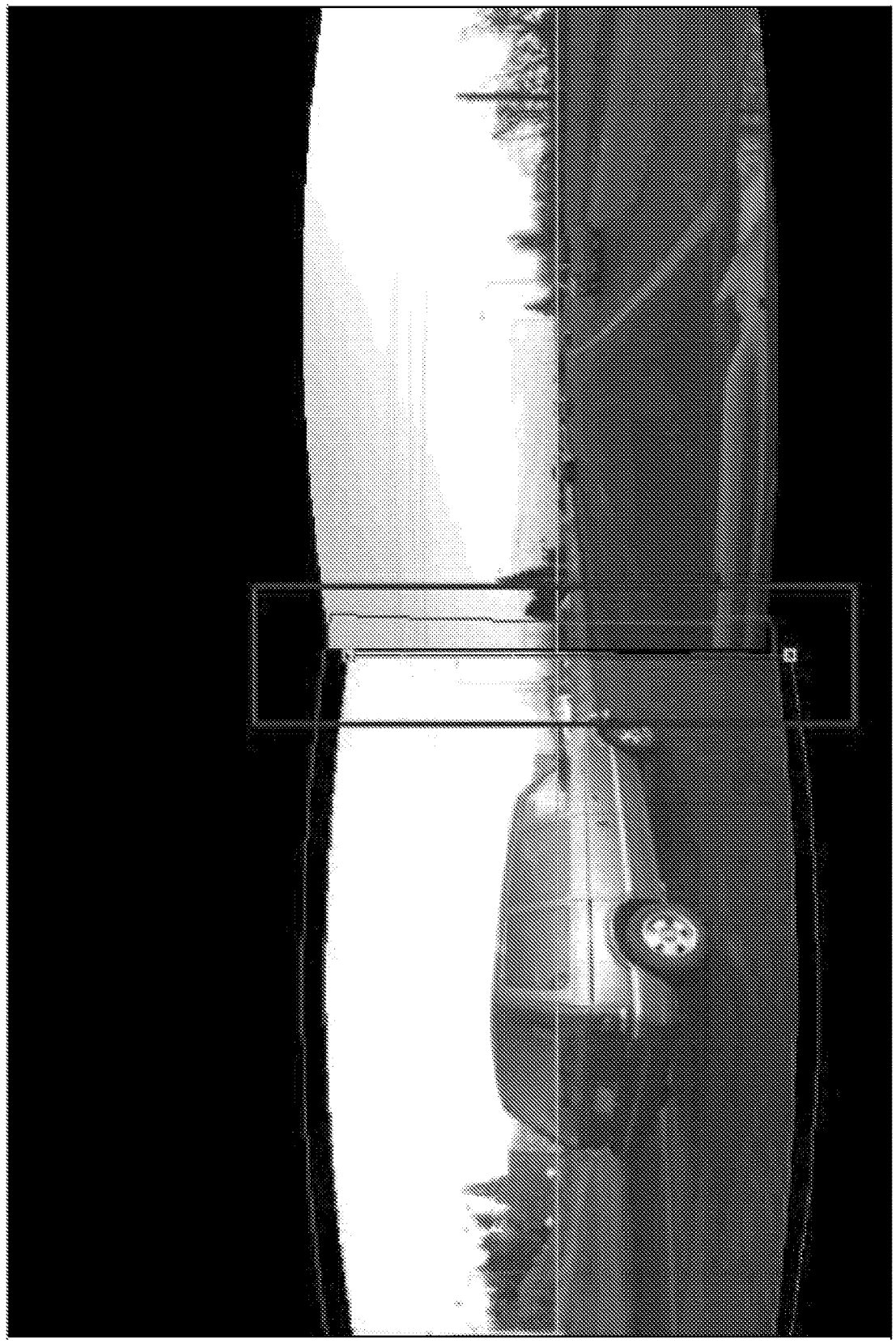

15 shows a user interface upon opening images stored in a file format, such as the one described above with reference to FIG. 11. The screenshot in FIG. 16 shows correction of an image for bank and pitch. FIG. 17 shows a technique by which images captured by adjacent separated video cameras may be aligned. The screenshot in FIG. 18 also shows a technique by which images captured by adjacent separated video cameras may be aligned. FIG. 19 shows completion of a seam adjustment. The screenshot in FIG. 20 shows a technique by which borders (or "extents) may be adjusted for, for example, the purpose of aligning images.

Upon modification of captured images according to, for example, the various techniques described above with reference to FIGS. 15-20, associated setting information (or calibration data) are stored in the data store 46. This calibration data may be stored in a configuration file that may be written to the file format described above with reference to FIG. 11. In one or more other embodiments, images may be displayed without the calibration data being written to the file format.

Figure 21:
FIG. 21 shows calibration data for use in a panoramic imaging system in accordance with an embodiment of the present invention.

FIG. 21 shows an example of an arrangement of calibration data that may result from image adjustments using the calibration module 50 in accordance with an embodiment of the present invention. In other words, calibration data shown in FIG. 21 may represent calibration data according to which image data in the file format described above with reference to FIG. 11 may be displayed. More particularly, the calibration data that may be added to a stream of images stored in accordance with file format described above with reference to FIG. 11.

In FIG. 21, a calibration frame 120, at a first portion, includes a header portion 122. The header portion 122 has identification information uniquely identifying calibration frame 120 (e.g., in timing relation to other image frames (not shown)). In one or more embodiments, the header information 122 may also have metadata describing the data contained in the calibration frame 120.

The calibration frame 120 may further include a camera data portion 124. The camera data portion 124 includes information about the particular separated video camera used to capture the image associated with calibration frame 120. For example, the camera data portion 124 may specify that the image associated therewith was taken by separated video camera 34 having a resolution of 1280×960 pixels. Those skilled in the art will note that various other types of information may be specified in the camera data portion 124 (e.g., type of camera used, resolution, shutter speed, zoom position).

Further, in one or more embodiments, the calibration frame 120 may include an alignment settings portion (calibration data) 126. Particularly, this portion 126 may contain any information associated with camera alignment settings that were modified with the calibration module 50 described above with reference to FIGS. 2 and 15-20. Moreover, in one or more embodiments, the alignment settings portion 126 may be associated with information that was stored in the orientation info portion 114 in the image frame 110 described above with reference to FIG. 11. Further, it is noted that in one or more embodiments, image alignment settings specified in the calibration frame 120 may be pushed back to the capture module 44 in an effort to make the alignment settings the default settings for the file format described above with reference to FIG. 11.

Now more specifically referring to an embodiment of the configuration file described above with reference to FIG. 21, data may be stored in the following format: current file directory; current filename; lens order and draw order; image dimensions (e.g., width and height); image position as heading, pitch, bank, FOV, PinAdjust (a parameter to adjust the amount of pincushion (fisheye)) and fisheye (flag if this is a fisheye or perspective lens) (for each image); image extents—for each image, store 4 corners of the image extents (limits visible region in spherical space) as heading, pitch pairs; and image flip in horizontal and vertical directions. It is noted that all these fields may not be present in a particular file. Further, it is noted that there may additional fields, e.g., lay down order, extents.

Accordingly, in one or more embodiments, it is noted that calibration data is written into the predetermined file format described above. The calibration module 50 may also create a separate configuration file, but the viewer module 48 may not have to use that file directly—the calibration module 50 may write the calibration data into the predetermined file format for the viewer module 48 to use the calibration data.

Further, one may add to the calibration stream and have calibration terms that get applied to image data collected later that the start. Thus, in other words, if one desired to, they could effectively change the pointing angles during an image collect phase and have the ability to have the changing calibration data reflect the changing pointing angles.

The various embodiments of a panoramic imaging system described above with reference to FIGS. 2-21 may be used in various different types of applications. For example, separated video cameras in a panoramic imaging system according to one or more embodiments may be used for surveillance around a vehicle. Further, for example, in one or more embodiments, separated video cameras in a panoramic imaging system may be used for surveillance around a building structure (e.g., an office building). Moreover, in one or more embodiments, separated video cameras in a panoramic imaging system may be used to perform surveillance, or otherwise monitor, a certain area, region, landmark, or landscape (e.g., a particular portion of a road, a home, a store, a residential area, a school, a military installation, an enemy foothold, a national security interest, a utility plant, a nuclear reactor).

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

The invention claimed is:
1. A panoramic imaging method comprising:
   capturing, at each of a plurality of video cameras distributed around an object, a series of images in an image capture file format, the image capture file format comprising calibration data of a corresponding video camera;
   receiving corrective input and modifying the calibration data of the image capture file format according to the corrective input to provide modified calibration data;
   rendering a panoramic video by, for each image frame in the series of images:
      placing the captured image frames from the plurality of separated video cameras relative to one another; and
      seaming the captured image frames from the plurality of separated video cameras;
      wherein at least one of placing the captured image frames and seaming the captured image frames is performed according to the modified calibration data.

2. A method according to claim 1 wherein the image file format comprises a timeline indicative of which captured image frames from the plurality of separated video cameras were captured at common times and wherein the modified calibration data comprises different modified calibration data at different times along the timeline.

3. A method according to claim 2 wherein the modified calibration data comprises a pointing angle for at least one of the plurality of video cameras.

4. A method according to claim 2 wherein the modified calibration data comprises an image position parameter for at least one of the plurality of video cameras, the image position parameter comprising at least one of: heading, pitch, bank, field of view, PinAdjust, and a fisheye flag.

5. A method according to claim 2 wherein the modified calibration data comprises image extent parameters for each image frame in the series of images captured by at least one of the plurality of video cameras.

6. A method according to claim 2 comprising storing the series of images captured by each of the plurality of video cameras in the image capture file format in a data store and wherein rendering the panoramic video is based on data stored in the data store.

7. A method according to claim 2 wherein rendering the panoramic video including at least one of placing the image frames and seaming the image frames according to the modified calibration data occurs in real time.

8. A method according to claim 2 wherein capturing, at each of the plurality of video cameras distributed around an object, the series of images in the image capture file format comprises:
   capturing a first series of images in the image file format at a first one of the plurality of video cameras; and
   capturing a second series of images in the image file format at a second one of the plurality of video cameras;
   wherein the first and second series of images have different sized or shaped fields of view.

9. A method according to claim 2 wherein rendering the panoramic video comprises rendering a panoramic video that has a 360° field of view.

10. A method according to claim 2 wherein capturing, at each of the plurality of video cameras distributed around an object, the series of images in the image capture file format comprises:
    capturing a first series of images in the image file format at a first one of the plurality of video cameras; and
    capturing a second series of images in the image file format at a second one of the plurality of video cameras;
    wherein the first and second series of images have different resolutions.

11. A method according to claim 1 wherein capturing, at each of the plurality of video cameras distributed around an object, the series of images in the image capture file format comprises:
    capturing a first series of images in the image file format at a first one of the plurality of video cameras; and
    capturing a second series of images in the image file format at a second one of the plurality of video cameras;
    wherein the first and second series of images have different sized or shaped fields of view.

12. A method according to claim 11 wherein the calibration data comprises an indication of the different size or shaped fields of view of the first and second series of images.

13. A method according to claim 1 wherein capturing, at each of the plurality of video cameras distributed around an object, the series of images in the image capture file format comprises:
    capturing a first series of images in the image file format at a first one of the plurality of video cameras; and
    capturing a second series of images in the image file format at a second one of the plurality of video cameras;
    wherein the first and second series of images have different resolutions.

14. A method according to claim 13 wherein the calibration data comprises an indication of the different resolutions of the first and second series of images.

15. A method according to claim 1 comprising, prior to receiving the corrective input:
    rendering at least one panoramic image by, for a particular image frame in the series of images:
    placing the captured image frames from the plurality of separated video cameras relative to one another; and
    seaming the captured image frames from the plurality of separated video cameras;
    wherein at least one of placing the image frames and seaming the image frames is performed according to the calibration data.

16. A method according to claim 1 wherein rendering the panoramic video comprises rendering a panoramic video that has a 360° field of view.

17. A method according to claim 1 wherein rendering the panoramic video comprises rendering a panoramic video that has a sub-spherical field of view.

18. A method according to claim 1 wherein the object comprises a vehicle and the plurality of video cameras are distributed around an interior of the vehicle.

19. A method according to claim 1 wherein receiving the corrective input comprises receiving the corrective input from a human user.

20. A panoramic imaging system comprising:
    a plurality of separated video cameras distributed around an object, each of plurality of separated video cameras configured to capture a series of images in an image capture file format, the image capture file format comprising calibration data of a corresponding video camera;
    a calibration module configured to receive corrective input and to modify the calibration data of the image capture file format according to the corrective input to provide modified calibration data; and
    a viewer module configured to render a panoramic video by, for each image frame in the series of images, placing the captured image frames from the plurality of separated video cameras and seaming the captured image frames from the plurality of separated video cameras wherein at least one of placing the captured image frames and seaming the captured image frames is performed according to the calibration data.

21. A system according to claim 20 wherein the image file format comprises a timeline indicative of which captured image frames from the plurality of separated video cameras were captured at common times and wherein the modified calibration data comprises different modified calibration data at different times along the timeline.

* * * * *